United States Patent
Würl

(10) Patent No.: US 12,098,759 B2
(45) Date of Patent: Sep. 24, 2024

(54) LINEAR SYSTEM FOR A MANUFACTURING PLANT AND METHOD OF ASSEMBLING SUCH A LINEAR SYSTEM

(71) Applicant: FERTIG Motors GmbH, Marktheidenfeld (DE)

(72) Inventor: Konrad Würl, Würzburg (DE)

(73) Assignee: Beckhoff Automation GmbH, Verl (DE)

( * ) Notice: Subject to any disclaimer, the term of this patent is extended or adjusted under 35 U.S.C. 154(b) by 57 days.

(21) Appl. No.: 17/889,711

(22) Filed: Aug. 17, 2022

(65) Prior Publication Data

US 2022/0389991 A1 Dec. 8, 2022

Related U.S. Application Data

(63) Continuation of application No. PCT/EP2021/055183, filed on Mar. 2, 2021.

(30) Foreign Application Priority Data

Mar. 3, 2020 (DE) ..................... 10 2020 105 709.1

(51) Int. Cl.
*F16H 25/22* (2006.01)
*F16H 25/24* (2006.01)
*F16H 25/20* (2006.01)

(52) U.S. Cl.
CPC ......... *F16H 25/2209* (2013.01); *F16H 25/24* (2013.01); *F16H 2025/204* (2013.01)

(58) Field of Classification Search
CPC ........... F16H 2025/204; F16H 25/2003; F16H 25/2009; F16H 2025/2031; F16H 25/24
See application file for complete search history.

(56) References Cited

U.S. PATENT DOCUMENTS 4,920,816 A * 5/1990 Inabe .................. F16H 25/2025
192/93 C
7,086,979 B2 8/2006 Frenken
(Continued)

FOREIGN PATENT DOCUMENTS

CN 108025728 A 5/2018
DE 10124265 A1 11/2002
(Continued)

OTHER PUBLICATIONS

Office Action dated Apr. 3, 2023 in connection with Chinese patent application No. 202180018165.X, 8 pages including English translation.
(Continued)

*Primary Examiner* — Gregory Robert Weber
(74) *Attorney, Agent, or Firm* — Dorsey & Whitney LLP

(57) ABSTRACT

A system includes a linear guide, drive device, spindle nut and spindle extending along an axis. The spindle nut is arranged on the spindle, with the spindle nut and spindle engaged. The drive device connects to the spindle nut in a torque-proof manner to rotate the spindle nut about the axis, moving the spindle parallel to the axis. The spindle has a spindle groove extending parallel to the axis on an outer circumferential side. The linear guide includes a guide housing arranged in a torque-proof manner, and a ledge element. The guide housing has a radially outwardly extending receptacle. The ledge element includes a radially outwardly disposed carrier and a ledge radially inwardly of the carrier, connected to the carrier and extending parallel to the
(Continued)

axis. The ledge element engages the carrier in the receptacle and the ledge in the spindle groove, guiding the spindle parallel to the axis.

17 Claims, 19 Drawing Sheets

(56) References Cited

U.S. PATENT DOCUMENTS

| | | | |
|---|---|---|---|
| 8,316,729 | B2 | 11/2012 | Schunke |
| 9,222,556 | B2 | 12/2015 | Schlecht et al. |
| 10,119,599 | B2 | 11/2018 | Fischer et al. |
| 2014/0300253 | A1 | 10/2014 | Rapp et al. |
| 2016/0186844 | A1 | 6/2016 | Yuasa |
| 2021/0197784 | A1 | 7/2021 | Drumm |

FOREIGN PATENT DOCUMENTS

| | | |
|---|---|---|
| DE | 102006027523 A1 | 1/2008 |
| DE | 102008051544 A1 | 4/2010 |
| DE | 102013003830 A1 | 9/2014 |
| DE | 202014103629 U1 | 9/2014 |
| DE | 102013216881 A1 | 2/2015 |
| DE | 102018201722 A1 * | 8/2019 |
| DE | 102018209543 A1 | 12/2019 |
| DE | 102018214188 A1 | 2/2020 |

OTHER PUBLICATIONS

"Medium Torque Type Ball Spline: Models LT and LF," THK Co., Ltd., 24 pages including English and German versions.
"Precision Ball Screw/Spline, Models BNS-A, BNS, NS-A and NS," THK Co., Ltd., 36 pages including English and German versions.
"Small servo drive system," Wittenstein cyber motor GmbH, 11 pages from <https://cyber-motor.wittenstein.de/en-en/small-servo-drive-system/>.
"Wave guides," THK Co., Ltd. 4 pages including English and German versions.
International Preliminary Report on Patentability dated Jan. 31, 2022 in connection with International Patent Application No. PCT/EP2021/055183, 83 pages including English translation.
Office Action dated Mar. 3, 2020 in connection with German patent application No. 10 2020 105 709.1, 16 pages Including English translation.
International Search Report and Written Opinion dated Jun. 7, 2021 in connection with International Patent Application No. PCT/EP2021/055183, 21 pages including English translation.
"Electric cylinders ESBF, with spindle drive," Festo, Jul. 2022, <www.festo.com/catalogue/>, 66 pages.

* cited by examiner

LINEAR SYSTEM FOR A MANUFACTURING PLANT AND METHOD OF ASSEMBLING SUCH A LINEAR SYSTEM

CROSS-REFERENCE TO RELATED APPLICATIONS

This application is a continuation of International Patent Application PCT/EP2021/055183, filed Mar. 2, 2021, entitled "Linear System for a Manufacturing Plant and Method of Assembling such a Linear System," which claims priority of German patent application DE 10 2020 105 709.1, filed Mar. 3, 2020, entitled "Linearsystem and Verfahren zur Montage solch eines Linearsystems," the disclosure content of each of which is hereby incorporated by reference, in the entirety and for all purposes.

FIELD

The present invention relates to a linear system for a manufacturing plant and a method of assembling such a linear system.

BACKGROUND

Linear systems with a drive motor, a spindle and a spindle nut are known in the art, wherein the drive motor drives the spindle nut and the spindle nut displaces the spindle in an axial direction. With the aid of the linear system, a rotary movement of the drive motor can be converted into an axial movement of the spindle in order to move certain components along an axis in a manufacturing plant. The manufacturing plant may be fully automated and connected to a data network to control the individual components, e.g. the linear system. In order to prevent the spindle from twisting when the spindle nut rotates on the spindle, the linear system comprises a linear guide.

For example, DE 10 2013 216 881 A1 describes a linear drive having a housing extending in the direction of a longitudinal axis and a threaded spindle received therein so as to be rotatable about the longitudinal axis, with which a spindle nut received in the housing so as to be axially displaceable engages. In this embodiment, a stroke of the linear actuator in the longitudinal direction is severely limited and may therefore only be used for simple applications in a manufacturing plant. If the linear actuator is permanently loaded with a force acting perpendicular to the longitudinal axis, high wear occurs on a stroke rod and its bearing.

A linear system is furthermore disclosed in DE 10 2018 201 722 A1.

SUMMARY

The present invention provides an improved linear system. Furthermore, the invention provides an improved method of assembling such a linear system.

According to a first aspect the linear comprises a linear guide, a drive device, a spindle nut and a spindle, the spindle extending along an axis. The spindle nut is arranged on the spindle, and the spindle nut and spindle engage with each other. The drive device is connected to the spindle nut on the output side in a torque-proof manner and is embodied to drive the spindle nut about the axis in order to rotate, the spindle nut being embodied to move the spindle in parallel to the axis while rotating about the axis. The spindle comprises a first spindle groove extending in parallel to the axis on a first outer circumferential side. The linear guide comprises a guide housing arranged in a torque-proof manner and a first ledge element. The guide housing comprises a first receptacle extending radially outward. The first ledge element has a radially outwardly arranged carrier and a ledge arranged radially inwardly relative to the carrier, connected to the carrier, and extending in parallel to the axis. The first ledge element engages with the carrier in the first receptacle of the guide housing and with the ledge in the first spindle groove and is embodied to guide the spindle in a direction parallel to the axis.

According to second aspect the linear system comprises a linear guide, a spindle nut, a spindle and a system housing, wherein the spindle extends along an axis, wherein the spindle has a first spindle groove extending in parallel to the axis on a first outer circumferential side, wherein the linear guide comprises a guide housing arranged in a torque-proof manner and a first ledge element, wherein the guide housing has a radially outwardly extending first receptacle, wherein the first ledge member comprises a radially outwardly disposed carrier and a ledge arranged radially inwardly of the carrier and connected to the carrier and extending in parallel to the axis, wherein the first ledge element engages with the carrier in the first receptacle of the guide housing and with the ledge in the first spindle groove and is configured to guide the spindle in a direction parallel to the axis, wherein a second outer circumferential side of the carrier and a first inner circumferential side of the first receptacle are embodied correspondingly to each other at least in sections, wherein the guide housing is fastened in the system housing of the linear system by a fastener, wherein the fastener is configured to introduce a clamping force into the guide housing to press the first inner circumferential side of the first receptacle at least sectionally against the second outer circumferential side and to fasten the carrier in the first receptacle by force-fit, wherein, a second outer circumferential side of the carrier and a first inner circumferential side of the first receptacle are embodied correspondingly to each other at least in sections, wherein the guide housing is fastened in a system housing of the linear system by a fastener, wherein the fastener is configured to introduce a clamping force into the guide housing to press the first inner circumferential side of the first receptacle at least sectionally against the second outer circumferential side and to fasten the carrier in the first receptacle by force-fit.

According to second aspect the linear system comprises a linear guide, a linear guide, a drive device, a spindle nut and a spindle, wherein the spindle extends along an axis, and wherein the spindle nut is arranged on the spindle and the spindle nut and the spindle engage with each other, wherein the drive device is connected to the spindle nut on the output side in a torque-proof manner and is embodied to drive the spindle nut to rotate about the axis, wherein the spindle nut is configured to move the spindle in parallel to the axis upon rotation about the axis, wherein the spindle has a first spindle groove extending in parallel to the axis on a first outer circumferential side, wherein the linear guide comprises a guide housing arranged in a torque-proof manner and a first ledge element, wherein the guide housing has a radially outwardly extending first receptacle, wherein the first ledge member comprises a radially outwardly disposed carrier and a ledge arranged radially inwardly of the carrier and connected to the carrier and extending in parallel to the axis, wherein the first ledge element engages with the carrier in the first receptacle of the guide housing and with the ledge in the first spindle groove and is configured to guide the spindle in a direction parallel to the axis, wherein the linear guide comprises a first spring element, wherein the first ledge element comprises a sliding surface on a side facing the spindle, wherein the carrier engages through the first receptacle in radial direction and protrudes from the first receptacle on a side facing away from the spindle, wherein the first spring element is arranged between an outer surface of the guide housing and a carrier outer surface of the carrier, wherein the first spring element is configured to position the first ledge element in the first spindle groove in such a way that the sliding surface is arranged in the first spindle groove at a predefined third distance from a spindle groove base of the first spindle groove.

EXAMPLES

It has been recognized that an improved system for a manufacturing plant may be provided by the linear system, by a linear system that comprises a linear guide, a drive device, a spindle nut and a spindle, the spindle extending along an axis. The spindle nut is arranged on the spindle, and the spindle nut and spindle engage with each other. The drive device is connected to the spindle nut on the output side in a torque-proof manner and is embodied to drive the spindle nut about the axis in order to rotate, the spindle nut being embodied to move the spindle in parallel to the axis while rotating about the axis. The spindle comprises a first spindle groove extending in parallel to the axis on a first outer circumferential side. The linear guide comprises a guide housing arranged in a torque-proof manner and a first ledge element. The guide housing comprises a first receptacle extending radially outward. The first ledge element has a radially outwardly arranged carrier and a ledge arranged radially inwardly relative to the carrier, connected to the carrier, and extending in parallel to the axis. The first ledge element engages with the carrier in the first receptacle of the guide housing and with the ledge in the first spindle groove and is embodied to guide the spindle in a direction parallel to the axis.

This embodiment has the advantage of ensuring a particularly good, uniform, form-fitting, preferably flat, contact between the ledge element and the spindle, so that wear of the first ledge element and/or the spindle is greatly reduced. Furthermore, the linear system is thereby particularly durable. By providing and engaging the first ledge element in the spindle groove, a thread pitch of a threaded groove of the spindle may be selected independently of the spindle diameter. In particular, the thread pitch may be selected to be particularly small. This means that the spindle may be individually adapted to the planned use of the linear system in the manufacturing plant without having to adapt the linear guide for this purpose.

Furthermore, the linear system is impervious to manufacturing and/or assembly tolerances, ensuring reliable operation in the manufacturing plant and minimizing maintenance and/or downtime of the manufacturing plant.

Furthermore, a tension-free alignment of the spindle is provided. This ensures high functional reliability of the linear system. Furthermore, the ledge has a wiping effect against particulate material, e.g. dust and impurities in the first spindle groove, so that the linear guide prevents penetration of particulate material from penetrating into a housing interior of the linear system.

Furthermore, the linear system has a particularly large stroke in the axial direction of the axis. The spindle may be permanently loaded with a force transverse to the axis without damaging the linear system. In particular, compared to a ball screw drive, an overload of individual balls is prevented. The force resulting from the mass of the spindle but also from an additional load, e.g. from another component, may be supported by the ledge element. This makes the embodiment particularly suitable for linear systems with a particularly large stroke.

Furthermore, the proposed linear system may compensate for manufacturing tolerances, e.g. a distance error and/or a position and manufacturing tolerance of the spindle groove.

In a further embodiment, a second outer circumferential side of the carrier and a first inner circumferential side of the first receptacle are embodied to correspond to each other at least in sections. The guide housing is fastened in a system housing of the linear system with a fastener, the fastener being embodied to introduce a clamping force acting in parallel to the axis into the guide housing in order to press the first inner circumferential side of the first receptacle against the second outer circumferential side. This embodiment has the advantage that the carrier is frictionally fastened in the first receptacle and, after fastening, radial displacement of the first ledge element in the radial direction is prevented by the frictional connection. This ensures that the engagement of the ledge in the first spindle groove is ensured throughout the service life of the linear system. Furthermore, this embodiment is particularly easy to assemble, preferably in an automated manner.

In another embodiment, the linear guide comprises a first spring element. The first ledge element has a sliding surface on a side facing the spindle. The carrier engages through the first receptacle in a radial direction and protrudes from the first receptacle on a side facing away from the spindle. The first spring element is arranged between an outer side of the guide housing and an outer side of the carrier. The first spring element is configured to position the first ledge element in the first spindle groove in such a way that the sliding surface is arranged in the first spindle groove at a predefined third distance from a spindle groove base of the first spindle groove. This embodiment has the advantage of avoiding overdetermination of the linear guide. Furthermore, a carrier of a radial force via the ledge at the spindle is avoided, so that a Hertzian pressure between ledge and spindle is low. This minimizes wear on the ledge, since the ledge is only loaded with a force acting in the circumferential direction.

In a further embodiment, the linear guide has a guide sleeve with a guide surface arranged radially on the inside, the guide sleeve being coupled to the system housing and engaging around the spindle, the guide surface bearing against the first outer circumferential side of the spindle and being embodied to support a radial force from the spindle acting in the radial direction. This embodiment has the advantage that the ledge is thereby relieved of load at the sliding surface and only forces acting in the circumferential direction act on the sliding surface. This minimizes wear on the ledge and the influence of any manufacturing tolerances of the threaded spindle and the ledge element.

In another embodiment, the linear guide has a first spring element. The first ledge element comprises a sliding surface on a side facing the spindle. The first spring element rests on the outside of the ledge of the first ledge element. The first spring element is embodied to hold the ledge of the first ledge element in the first spindle groove in such a way that the sliding surface rests against the first spindle groove. This embodiment has the advantage that the radial force from the spindle may also be supported via the sliding with the aid of the ledge and a further radial bearing of the spindle may be dispensed with.

In a further embodiment, the first spring element is annular, wherein the first spring element is arranged on a side of the ledge of the first ledge element facing away from the spindle, the first spring element engaging around the circumference of the spindle and being arranged at a distance from the spindle. This embodiment has the advantage that the first spring element may be mounted particularly easily on the first ledge element and the spindle.

In a further embodiment, the linear guide has a plate-like pressure plate arranged in the first receptacle, the pressure plate having a convex first abutment surface on a side facing the axis and a second abutment surface arranged on a side facing away from the axis. The carrier of the first ledge element has a concave second abutment surface radially on the outside. The second abutment surface rests against the first abutment surface. The guide housing has a first through-opening extending in the radial direction and a fixing element, the first through-opening opening into the first receptacle on the radially inner side. The fixing element is arranged so as to be adjustable in the radial direction in the first through-opening and rests radially on the inside against a second abutment surface of the pressure plate. This embodiment has the advantage that due to the contact of the fixing element with the pressure plate and the pressure plate with the carrier as well as the ledge of the first ledge element in the first spindle groove, the spindle groove is held by the linear guide without any clearance.

Advantageously, the spindle has a second spindle groove extending parallel to the axis on the first outer circumferential side, the second spindle groove being arranged at an offset from the first spindle groove in circumferential direction. The linear guide has at least one second ledge element and the guide housing has a second receptacle. The second receptacle extends in the radial direction with respect to the axis and is arranged at an offset with respect to the first receptacle in the circumferential direction. The second ledge element engages with a ledge of the second ledge element in the second spindle groove and with a carrier of the second ledge element in the second receptacle. This embodiment has the advantage that particularly good guidance of the spindle is ensured and, in addition, the spindle is supported in the radial direction.

In a further embodiment, the first spring element engages around the spindle, the first ledge element and the second ledge element. The first spring element rests radially on the outside of the ledge of the second ledge element and secures the second ledge element in the second spindle groove. As a result, the number of components may be kept low.

It is of particular advantage if the first spring element is embodied as an O-ring and comprises an elastic material.

In a further embodiment, the linear guide comprises at least a second spring element, the second spring element being arranged at an offset from the first spring element in a direction parallel to the axis. The carrier of the first ledge element is arranged between the first spring element and the second spring element. The second spring element engages around the spindle and lies radially on the outside of the ledge of the first ledge element. The first spring element and the second spring element jointly secure the ledge of the first ledge element in the first spindle groove. This prevents the ledge from tilting when the spindle is mounted in the linear guide, so that the linear system may be mounted automatically.

In a further embodiment, the spindle has a threaded groove on the first outer circumferential side. The threaded groove is helically shaped around the axis. The threaded groove and the first spindle groove cross at an angle. The angle is preferably 65° to 88°. As a result, the spindle may be kept particularly short, so that the linear system also has a particularly small overall extension in a direction parallel to the axis. It is of particular advantage if the first spindle groove has a spindle groove base and the threaded groove has a threaded groove base, the threaded groove base being arranged in the radial direction at a smaller distance from the axis than the spindle groove base. This prevents the spindle nut from catching when engaging in the threaded groove on the first spindle groove.

In a further embodiment, the first ledge element and the guide housing are embodied in one piece and of the same material. This reduces the number of components. In particular, the spring elements mentioned above may be dispensed with in this embodiment.

It has been recognized that an improved method of assembling a linear system, wherein the linear system may be as previously described, may be provided by providing a guide housing, at least a first ledge element, a first spring element, and a spindle. Thereby, the carrier is inserted into the first receptacle, wherein the ledge of the first ledge element is inserted into the first spindle groove and a position of the first ledge element relative to the guide housing is defined by generating a clamping force acting in the axial direction.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention will be discussed in more detail below on the basis of figures. Here, in a schematic illustration in each case.

DETAILED DESCRIPTION

Figure 1:
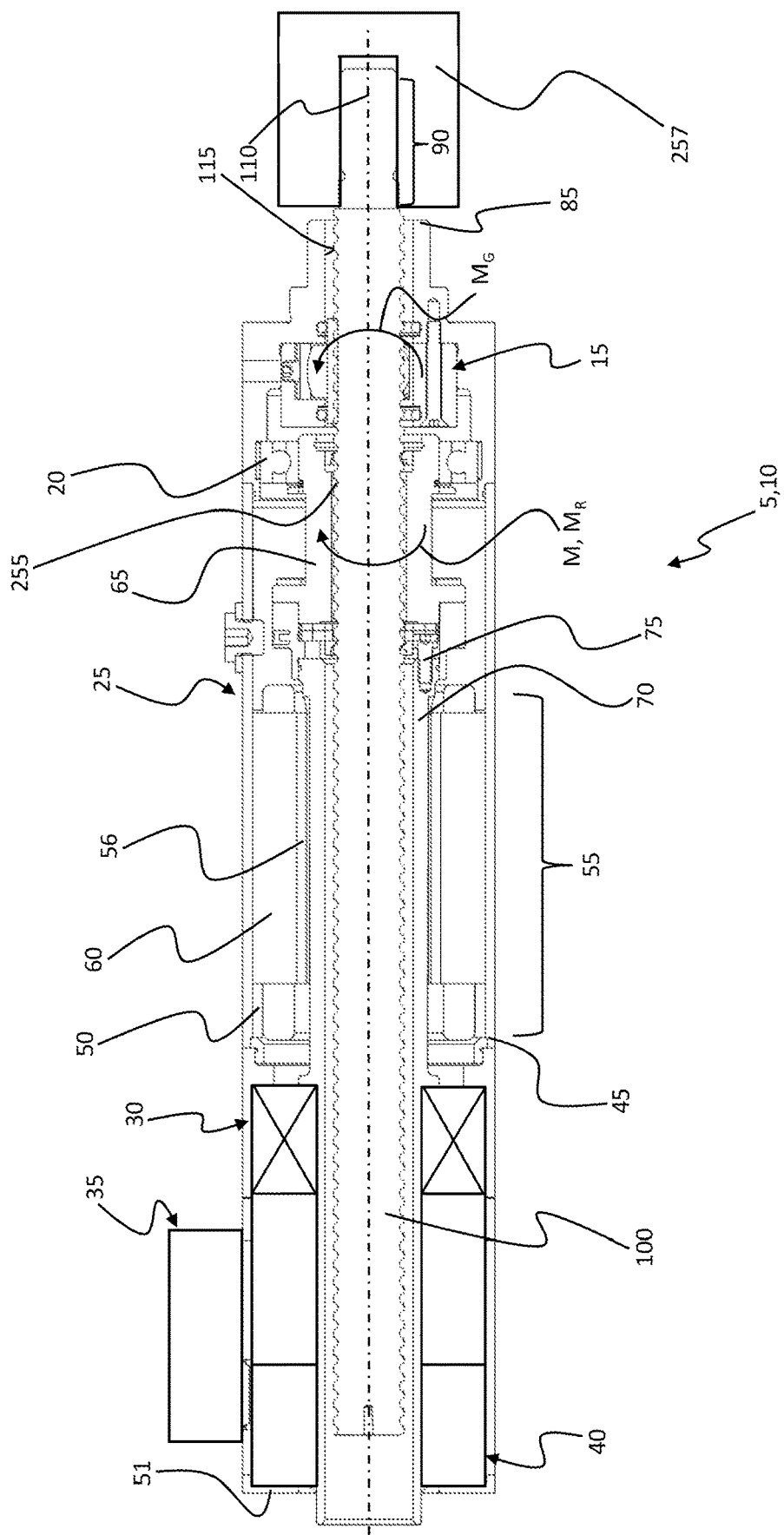
FIG. 1 shows a longitudinal section through a linear system of a manufacturing plant in a general embodiment.

In the following FIGS. 1 to 19, the reference numerals are used throughout for the same components to facilitate understanding. Furthermore, hatching is not used in sectional views for reasons of clarity.

FIG. 1 shows a longitudinal section through a linear system 10 of a production line 5 in a general embodiment.

The linear system 10 comprises a linear guide 15, a first bearing assembly 20, a drive device 25, a second bearing assembly 30, a contact device 35, a rotary encoder 40, a system housing 45 limiting a housing interior 50, and a spindle 100.

The spindle 100 and the system housing 45 extend, in their main direction of extension, along an axis 110. In the following, reference is made to the axis 110 for easier understanding. Here, an axial direction with respect to the axis 110 is understood to be a direction parallel to the axis 110. A circumferential direction is a direction on a circular path around the axis 110 in a plane perpendicular to the axis 110. In a plane, a radial direction runs towards the axis 110 or away from the axis 110.

On the outside of the system housing 45, the contact device 35 is arranged at the system housing 45. The contact device 35 provides electrical contacting of the linear system 10 for connection to a data network and to an electrical power supply. The electrical power supply may e-g-be a DC electrical power source. The data network may e.g. be operated on the basis of a standardized protocol, in particular an encoder protocol, e.g. HIPERFACE manufactured by SICK or BISS-C, for controlling the linear system 10.

The system housing 45 has an exemplary cuboidal embodiment. The system housing 45 extends between a first axial end 51 and a second axial end 85 arranged axially opposite the first end 51. The rotary encoder 40 is e.g. arranged in the housing interior 50 adjacent to the first axial end 51. The rotary encoder 40 is electrically connected to the contact device 35 via a first electrical connection.

By way of example, the drive device 25 comprises a drive motor 55 having a rotor 56 and a stator 60. Furthermore, the drive device comprises a spindle nut 65 and a hollow shaft 70.

The drive motor 55 may e.g. be embodied as an electric machine, in particular as a brushless DC motor. In this embodiment, the rotor 56 comprises a plurality of permanent magnets as an example. The stator 60 is arranged radially outwards with regard to the rotor 56. The stator 60 is connected to the system housing 45 in a torque-proof manner and abuts on the inside of the system housing 45. Furthermore, the stator 60, which preferably comprises a plurality of coils arranged next to one another in the circumferential direction, is electrically connected to the contact device 35, e.g. via a second electrical connection.

The spindle 100 comprises a threaded groove 255. The threaded groove 255 has a screw-like arrangement at a first outer circumferential side 115 of the spindle 100. The first outer circumferential side extends about the axis 110 in a circular path. The threaded groove 255 extends substantially over a large portion of the first outer circumferential side 115 of the spindle 100. In FIG. 1, the spindle 100 protrudes from the system housing 45 at the second end 85 of the system housing 45 with a connection section 90, as an example. The connection section 90 adjoins the threaded groove 255 in an axial direction. For example, an external thread or spur gear may be arranged at the connection section 90 for attaching another component 257 of the manufacturing system 5.

The spindle nut 65 engages with the threaded groove 255 of the spindle 100. The engagement element 80 may be embodied as an internal thread corresponding to the threaded groove 255. Also, the spindle nut 65 may comprise one or a plurality of balls that engage the threaded groove 255 and roll in the threaded groove 255.

The spindle nut 65 is supported radially outwardly on a side facing away from the first end 51 by the first bearing arrangement 20 for rotation about the axis 110. The first bearing arrangement 20 is configured to support a first radial force acting in a radial direction on the first bearing arrangement 20 from the spindle nut 65 on the system housing 45.

On a side facing away from the first end 51, the hollow shaft 70 is non-rotatably connected to the spindle nut 65 in a torque-proof manner.

On a side facing the first end 51, the hollow shaft 70 is supported by the second bearing arrangement 30 for rotation about the axis 110 in both radial and axial directions. Compared to the first bearing arrangement 20, the second bearing arrangement 30 is configured to support an axial force acting in the axial direction and a second radial force acting in the radial direction from the hollow shaft 70 at the system housing 45.

On the side facing the second side, the hollow shaft 70 is connected to the spindle nut 65 in a torque-proof manner, for example with a screw connection 75. Radially on the outside, the rotor 56 is arranged on the hollow shaft 70 and is connected to the hollow shaft 70 in a torque-proof manner. The hollow shaft 70 and the spindle nut 65 are penetrated by the spindle 100. The hollow shaft 70 is embodied to be significantly longer than the spindle nut 65 in the axial direction with respect to the axis 110. For example, the hollow shaft 70 protrudes from the system housing 45 at the front face of the first end 51 of the system housing 45 in sections, wherein the housing interior 50 may be sealed from an environment of the linear system 10 at the first end 51.

Axially adjacent to the second end 85 of the system housing 45, the linear guide 15 is arranged in the housing interior 50. The structural design of the linear guide 15 is discussed in detail in FIGS. 2 to 19. The linear guide 15 is connected to the system housing 45 in a torque-proof manner. The linear guide 15 supports the spindle 100 and prevents rotation of the spindle 100 about the axis 110. The linear guide 15 permits axial displacement of the spindle 100 along the axis 110.

When electrical power is supplied to the drive motor 55, the rotor 56 provides a torque M acting about the axis 110. The rotor 56 introduces the torque M into the hollow shaft 70. The hollow shaft 70 transmits the torque M to the spindle nut 65 via the threaded connection 75. The torque M rotates the spindle nut 65 about the axis 110, and the spindle nut moves the spindle 100 along the axis 110. The engagement of the spindle nut 65 in the threaded groove 255 and the resulting friction between the threaded groove 255 and the spindle nut 65 causes a frictional torque $M_R$ to act on the spindle 100. The frictional torque $M_R$ would cause the spindle 100 to rotate about the axis 110 if no linear guide 15 were provided for the spindle 100.

The linear guide 15 provides a counter-torque $M_G$ to the frictional torque $M_R$. The counter torque $M_G$ acts in the opposite direction to the frictional torque $M_R$ in the circumferential direction. The counter-torque $M_G$ causes the spindle 100 to be held in the circumferential direction when the spindle nut 65 rotates about the axis 110 and is pushed in the axial direction along the axis 110 out of or into the housing interior 50, but without pivoting of the spindle 100 about the axis 110.

Figure 2:
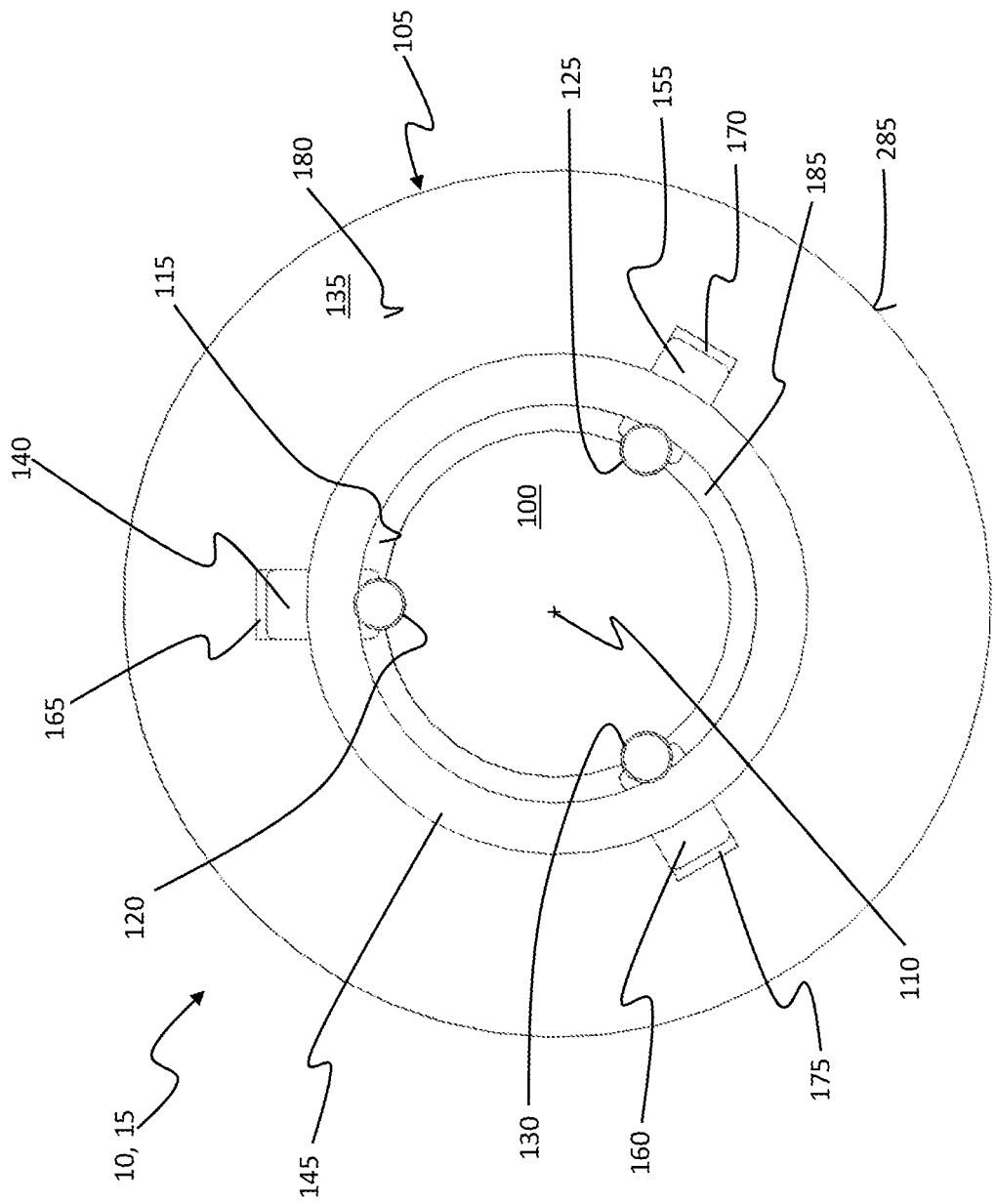
FIG. 2 shows a top view of a linear guide of a linear system according to a first embodiment.

FIG. 2 shows a top view of the linear guide 15 of a linear system 10 according to a first embodiment.

For clarity, the spindle 100 is only shown in a simplified representation in FIGS. 2 to 6. The spindle 100 comprises a first spindle groove 120 extending in parallel to the axis 110 on the first outer circumferential side 115, which extends on a circular path around the axis 110. Additionally, the spindle 100 may also have a second spindle groove 125 on the first outer circumferential side 115 that is circumferentially offset from the first spindle groove 120 with respect to the axis 110. Further, the spindle 100 may additionally comprise a third spindle groove 130 on the first outer circumferential side 115 that is circumferentially offset with respect to the axis 110 from the first spindle groove 120 and the second spindle groove 125. The second and third spindle grooves 125, 130 run in parallel to the axis 110 in the same way as the first spindle groove 120. The first to third spindle grooves 120, 125, 130 are e.g. ground into the spindle 100.

In FIG. 2, the first spindle groove 120, the second spindle groove 125 and the third spindle groove 130 are e.g. arranged at a regular distance from each other, e.g. at an angle of 120°.

The linear guide 15 comprises a guide housing 135, a first ledge element 140, a first spring element 145 and preferably a second spring element 150. The second spring element 150 is hidden in FIG. 2 and shown in FIG. 5. In addition, the linear guide 15 may have a second ledge element 155 and a third ledge element 160.

The guide housing 135 is connected to the system housing 45 in a torque-proof manner so that no rotation of the guide housing 135 occurs about the axis 110 during operation of the linear system 10. The guide housing 135 has an annular embodiment relative to the axis 110. The guide housing 110 comprises a first receptacle 165. Additionally, the guide housing 135 comprises a second receptacle 170 and a third receptacle 175. The first to third receptacles 165, 170, 175 are arranged in an exemplary manner at a regular spacing, e.g. at an angle of 120°, offset from one another in the circumferential direction about the axis 110. The first to third receptacles 165, 170, 175 join a first front face 180 of the guide housing 135 in the axial direction with respect to the axis 110. In the assembled state of the linear guide 15 in the system housing 45, the first front face 180 abuts on the system housing 45 on a side facing the second end 85.

The first front face 180 is oriented perpendicularly with regard to the axis 110. The first to third receptacles 165, 170, 175 extend in parallel to the axis 110 in the axial direction and open radially on the inside at a spindle passage 185. The spindle passage 185 extends through the entire guide housing 135 and has an approximately circular configuration in a top view. The spindle 100 completely extends through the spindle passage 185 in the axial direction. A radial gap is embodied between the first outer circumferential side 115 and the guide housing 135.

The first to third receptacles 165, 170, 175 extend radially outwardly from the spindle passage 185. In the embodiment shown in FIG. 2, the first to third receptacles 165, 170, 175 are closed radially outwardly with regard to a housing outer surface 285. The housing outer side 285 lies on the inside of the system housing 45 and is cylindrical in shape.

Figure 3:
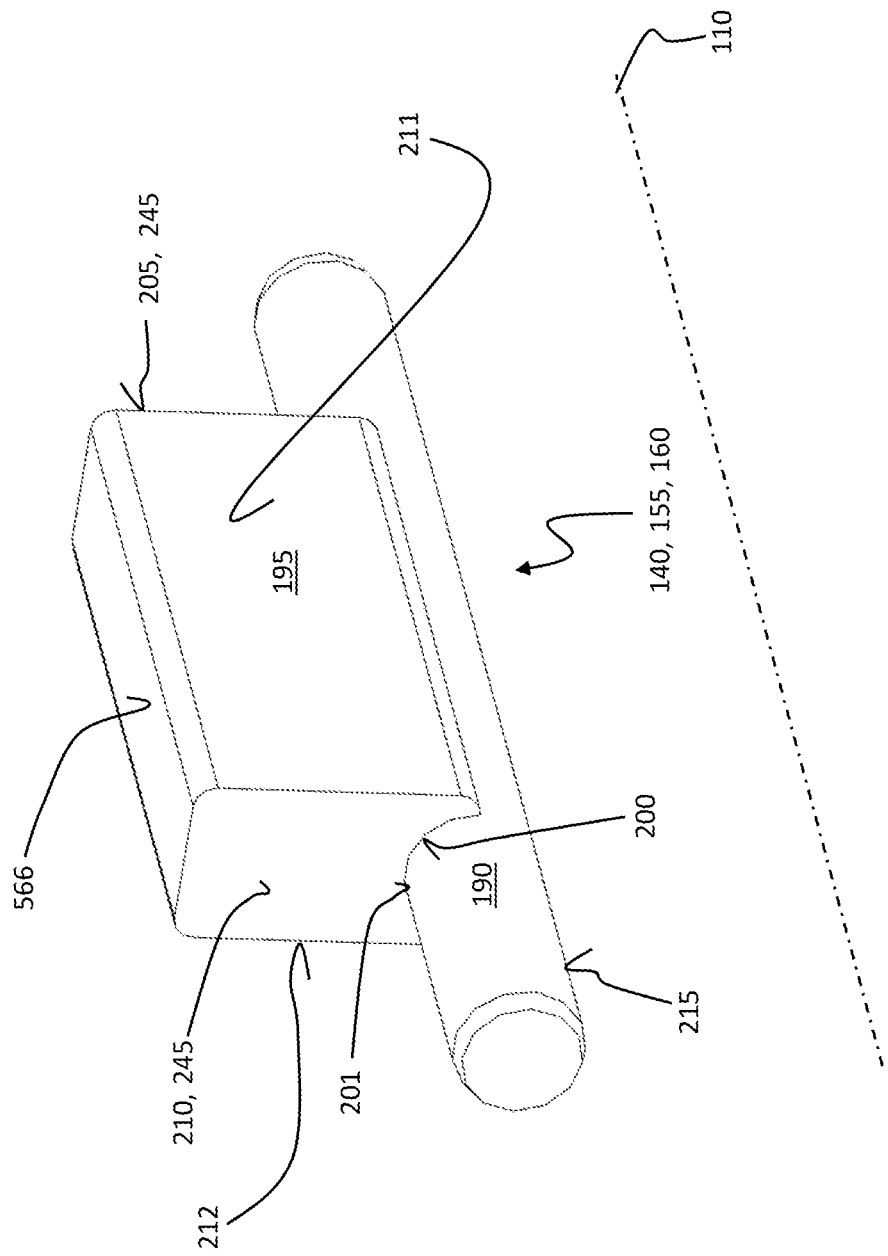
FIG. 3 shows a perspective view of a first ledge element of the linear system shown in FIG. 2.

FIG. 3 shows an enlarged perspective view of the first ledge element 140 of the linear system 10 shown in FIG. 2.

The first ledge element 140 is identical to the second ledge element 155 and the third ledge element 160. The following description of the first ledge element 140 therefore also applies to the second ledge element 155 and third ledge element 160 shown in FIG. 2.

The first ledge element 140 has a ledge 190, the ledge 190 being cylindrical in shape. The ledge 190 extends parallel to the axis 110 in the assembled state of the linear guide 15.

The first ledge member 140 further comprises a carrier 195, the carrier 195 extending parallel to the axis 110 in its main direction of extension when assembled. The carrier 195 comprises a second outer circumferential side 245. The second outer circumferential side 245 is embodied substantially corresponding to the embodiment of the respective first to third receptacles 165, 170, 175 at least in the circumferential direction with respect to the axis 110. In this context, the first circumferential side 245 is understood to be a circumferential surface of the carrier 195. The carrier 195 has a substantially cuboidal configuration. On the front face, the first circumferential side 245 has a second front face 205 and a third front face 210. By way of example, the second front face 205 and the third front face 210 are each arranged in a plane perpendicular to the axis 110. The second front face 205 is arranged opposite the third front face 210 in the axial direction with respect to the axis 110.

Furthermore, the second outer circumferential side 245 of the carrier 195 comprises a first side surface 211 and a second side surface 212. The first side surface 211 and the second side surface 212 connect the second front face 205 to the third front face 210 and are oriented in parallel to the axis 110. The first and second side surfaces 211, 212 are oriented in parallel to each other.

Radially outwardly, the carrier 195 has an outer carrier side 566 on a side facing away from the ledge 190, which may be aligned in parallel to the axis 110. The outer side 566 of the carrier may e.g. be flat. A curved embodiment is possible, as well.

Radially inwardly, the carrier 195 has a fastening surface 200. In a top view, the beam 195 has a substantially rectangular configuration, with the fastening surface 200 being arranged radially inwardly. The fastening surface 200 is embodied to correspond to a shell surface 201 of the ledge 190. The fastening surface 200 has a substantially exemplary semi-circular configuration in a top view.

At the fastening surface 200, the ledge 190 is connected to the carrier 195 in a material fit. The shell surface 201 of the ledge 190 may in this context be bonded to the fastening surface 200. The ledge 190 may also be embodied integrally and in one material piece with the carrier 195. It is of particular advantage if the ledge 190 comprises at least a heat-treatable steel. It is advantageous if the first ledge element 140 is hardened at least at the shell surface 201. The first ledge element 140 may also be through-hardened.

In the axial direction, in parallel to the axis 110, the ledge 190 in FIG. 3 is longer than the carrier 195, so that in the assembled state the ledge 190 projects axially from the carrier 195 beyond the second front face 205 of the carrier 195 on one side and beyond the third front face 210 on the other side. In this case, the ledge 190 may be aligned centrally with respect to the carrier 195, so that on both sides the ledge 190 projects beyond the carrier 195 by the same length.

On a side facing away from the carrier 195, the shell surface 201 forms a sliding surface 215. The shell surface 201 is slightly more curved than the contour of the first spindle groove 120 in cross-section. It is of particular advantage if a surface hardness of the ledge 190 at the sliding surface 215 is less than a surface hardness in the first to third spindle grooves 120, 125, 130.

Figure 4:
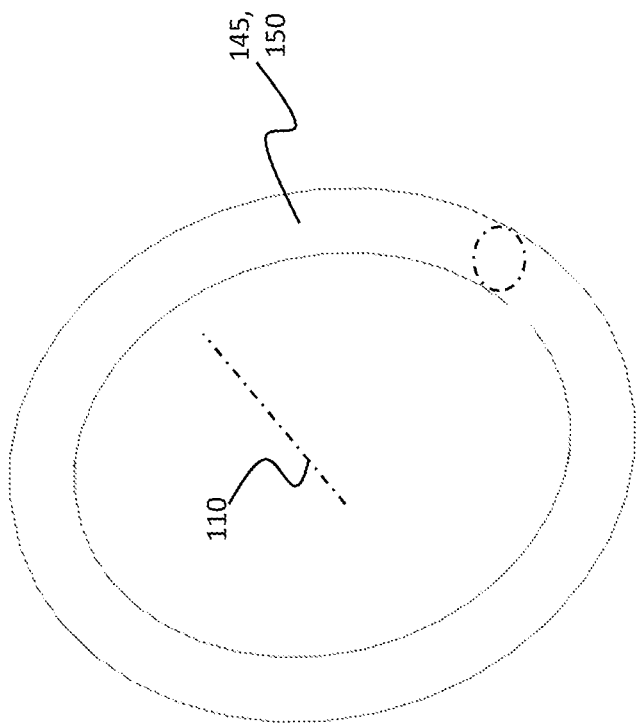
FIG. 4 shows a perspective view of a first and a second spring element of the linear system shown in FIGS. 2 and 3.

FIG. 4 shows a perspective view of the first and second spring elements 145, 150 of the linear system 10 shown in FIGS. 2 and 3.

The first spring element 145 and the second spring element 150 are e.g. embodied identically to each other. In the embodiment, the first and/or second spring element 145, 150 is embodied in a ring-like manner with respect to the axis 110. The first and/or second spring element 145, 150 may have a circular cross-section. The first and/or second spring element 145, 150 may also be generally referred to as an O-ring. Preferably, the first spring element 145 and/or second spring element 150 comprises an elastic, reversibly deformable material. For example, the material may comprise silicone, rubber, elastomer.

Figure 5:
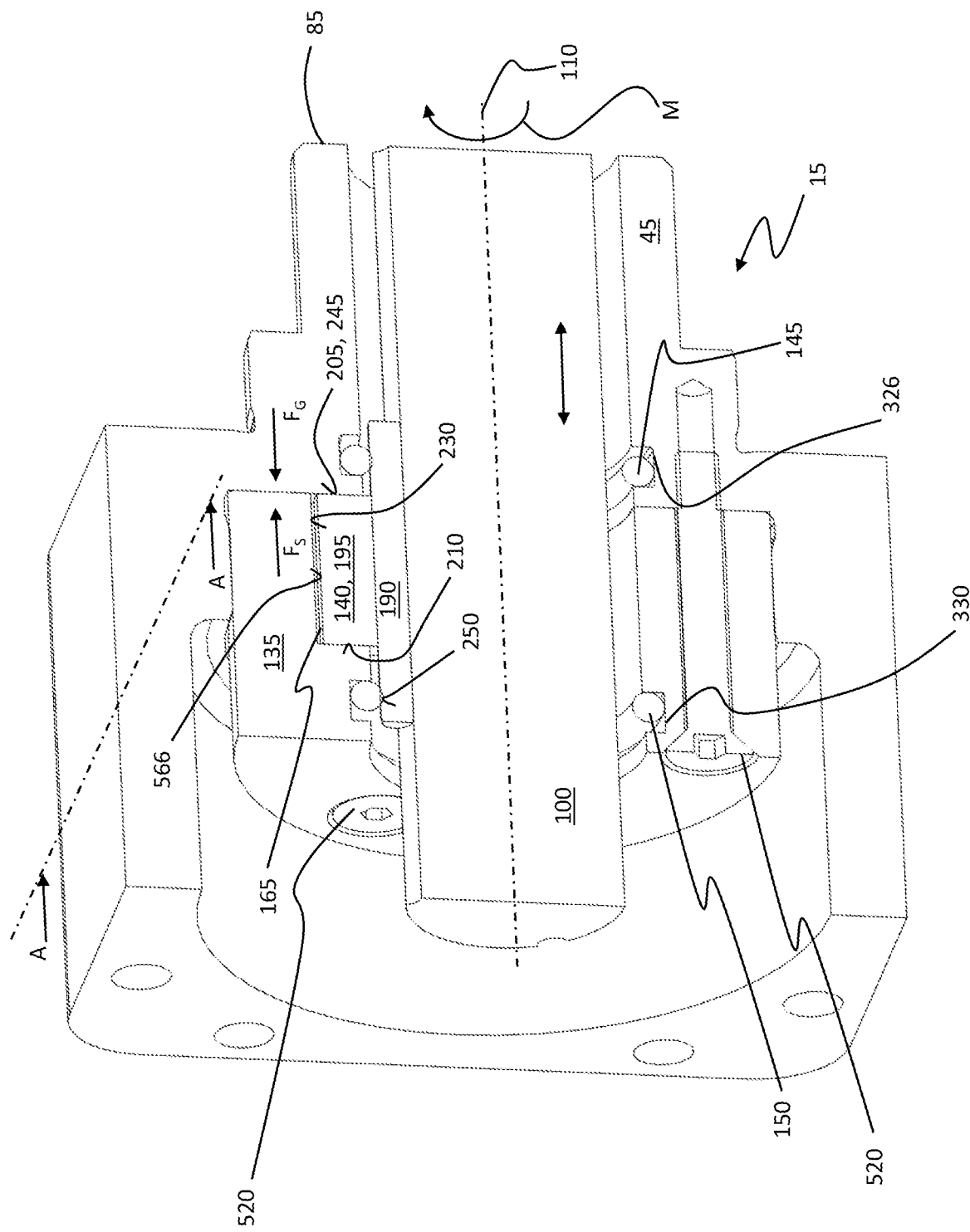
FIG. 5 shows a perspective longitudinal section along an axis shown in FIG. 2 through the linear system shown in FIG. 2.

FIG. 5 shows a perspective longitudinal section along the axis 110 shown in FIG. 2 through the linear system 10 shown in FIG. 2.

The first receptacle 165 is axially closed by the guide housing 135 on a side facing a fourth front face 335 of the guide housing 135. In the axial direction, the first receptacle 165 may be embodied slightly shorter than the carrier 195. The first receptacle 165 opens into the first front face 180. The first front face 180 and the fourth front face 335 run in parallel to each other and are aligned perpendicularly to the axis 110. In the assembled state of the linear guide 15 in the system housing 45, the fourth front face 335 is arranged on a side facing the first end 51 and the spindle nut 65.

The system housing 45 comprises a first circumferential groove 326. The first groove 326 is arranged in the axial direction between the guide housing 135 and the second end 85 of the system housing 45. The first groove 326 opens radially inwardly at the spindle passage 185. The first groove 326 is embodied wider in the longitudinal direction than the first spring element 145. The first spring element 145 is arranged in the first groove 326. The first groove 326 may e.g. be rectangular in shape.

Between the fourth front face 335 and the first receptacle 165, a second circumferential groove 330 is embodied in the guide housing 135, which opens radially on the inside in the spindle passage 185. The second spring element 150 is disposed in the second groove 330. The second groove 330 is embodied wider in the longitudinal direction than the second spring element 150. The second groove 330 may e.g. be rectangular in shape.

Due to the arrangement of the first and second spring elements 145, 150 in the first and second grooves 326, 330, respectively, the linear guide 15 has a particularly compact embodiment in the axial direction with respect to the axis 110.

The guide housing 135 is connected to the system housing 45 with a fastener 520. The fastener 520 provides a clamping force $F_S$ acting in axial direction parallel to the axis 110. The fastener 520 may have one or a plurality of screws which engage through the guide housing 135 in the axial direction and are screwed into the system housing 45.

The system housing 45 provides a counterforce $F_G$ corresponding to the clamping force F. The counterforce $F_G$ acts against the clamping force $F_S$ in the axial direction. The guide housing 135 presses against the third front face 210 with the clamping force $F_S$. The carrier 190 is pressed against the front face of the system housing 45 by the clamping force $F_s$ at the second front face 205. This provides a frictional connection between the carrier 190, the guide housing 135 and the system housing 45.

Figure 6:
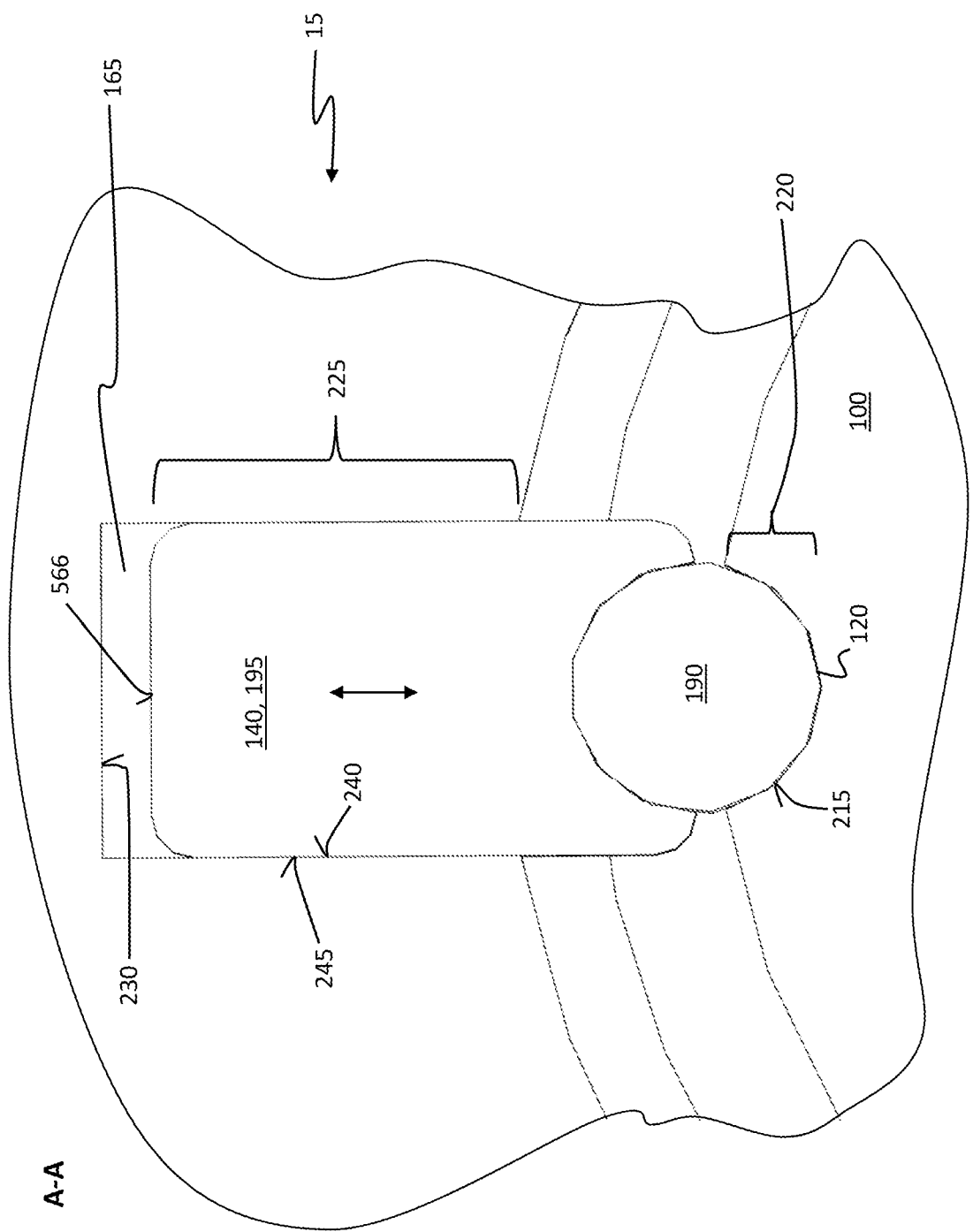
FIG. 6 shows a detailed view along a sectional plane A-A shown in FIG. 5 through the linear system shown in FIG. 5.

FIG. 6 shows a sectional view along a sectional plane A-A shown in FIG. 5 through the linear system 10 shown in FIG. 5.

A second outer circumferential side 245 of the carrier 195 is embodied to correspond, at least in part, to a first inner circumferential side 240 of the first receptacle 165. The first ledge member 140 engages the first spindle groove 120 with a first portion 220. In doing so, the sliding surface 215 engages the first spindle groove 120.

With a second partial section 225 of the carrier 195, the carrier 195 engages in the first receptacle 165. In a radial direction, the first receptacle 165 is embodied such that an outer side 566 of the carrier, which is arranged radially on the outside of the carrier 195 of the first ledge element 140 and preferably runs in parallel to the axis 110, is arranged spaced apart from a receptacle base 230 of the first receptacle 165 in a radial direction. The spaced arrangement prevents overdetermination of the linear guide 15. Further, this provides tolerance compensation for the spindle 100 in the radial direction.

The first inner circumferential side 240 of the first receptacle 165 may be embodied with regard to the second outer circumferential side 245 of the carrier 195, e.g. as a clearance fit system to ensure reliable movement of the first ledge element 140 in radial direction with respect to the axis 110 in the assembly of the linear guide 15. Furthermore, reliable sliding of the second outer circumferential side 245 against the first inner circumferential side 240 of the first receptacle 165 is ensured in the assembly. The clearance fit system is selected to be present only in the assembly and, in the assembled state, the clearance fit system is cancelled and the carrier 195 is frictionally secured to the system housing 45 and the guide housing 135 via the clamping force $F_S$ and the counter force $F_G$.

FIGS. 5 and 6 are described in conjunction.

The second spring element 150 is e.g. embodied identically to the first spring element 145. In the assembled state of the linear guide 15, the first spring element 145 and the second spring element each bear radially outwardly with a second inner circumferential side 250 against the shell surface 201 of the ledge 190 of the first ledge element 140.

Due to the annular embodiment of the first spring element 145 and the second spring element 150, the first spring element 145 and the second spring element 150 not only embrace the ledge 190 of the first ledge element 140, but also the ledge 190 of the second ledge element 155 as well as the ledge 190 of the third ledge element 160 radially on the outside. This reduces a number of components of the linear guide 15 for holding the ledge 190 in the respective first to third spindle grooves 120, 125, 130.

Furthermore, the first spring element 145 and the second spring element 150 embrace the spindle 100. The second inner circumferential side 250 of the first and second spring elements 145, 150 is preferably arranged at a distance from the first outer circumferential side 115 of the spindle 100.

This prevents jamming and/or snagging of the first and/or second spring elements 145, 150 on the threaded groove 255.

When assembled, the first spring element 145 and the second spring element 150 are applied to the ledge 190 of the first through third ledge elements 140, 155, 160 such that the annular configuration of the first spring element 145 and the second spring element 150 is substantially maintained.

In the axial direction, the second spring element 150 is offset from the first spring element 145.

The second spring element 150 and the first spring element 145 ensure that the sliding surface 215 of the respective ledge 190 engages with the respective first to third spindle groove 120, 125, 130. At the contact between the first to third spindle grooves 120, 125, 130 and the respective abutting ledge 190, the frictional torque $M_R$ and the counter torque $M_G$ act against each other. As a result, rotation of the spindle 100 about the axis 110 is prevented by the linear guide 15.

The contact, which is two-dimensional due to the Hertzian pressure, prevents the ledge 190 from jamming in the respective associated first to third spindle grooves 120, 125, 130. Furthermore, the ledge 190 ensures good guidance when the spindle 100 moves along the axis 110.

Due to the one-piece and material-uniform embodiment of the first to third ledge elements 140, 155, 160 or the material-fit connection of the corresponding ledge 190 to the carrier 195 of the first to third ledge elements 140, 155, 160, the counter-torque $M_G$ is supported radially outwardly via the first to third ledge elements 140, 155, 160. The counter-torque $M_G$ is supported at the guide housing 135 by the engagement of the second partial section 225 through the respective corresponding first to third receptacles 165, 170, 175 at the guide housing 135 arranged in a torque-proof manner.

Figure 7:
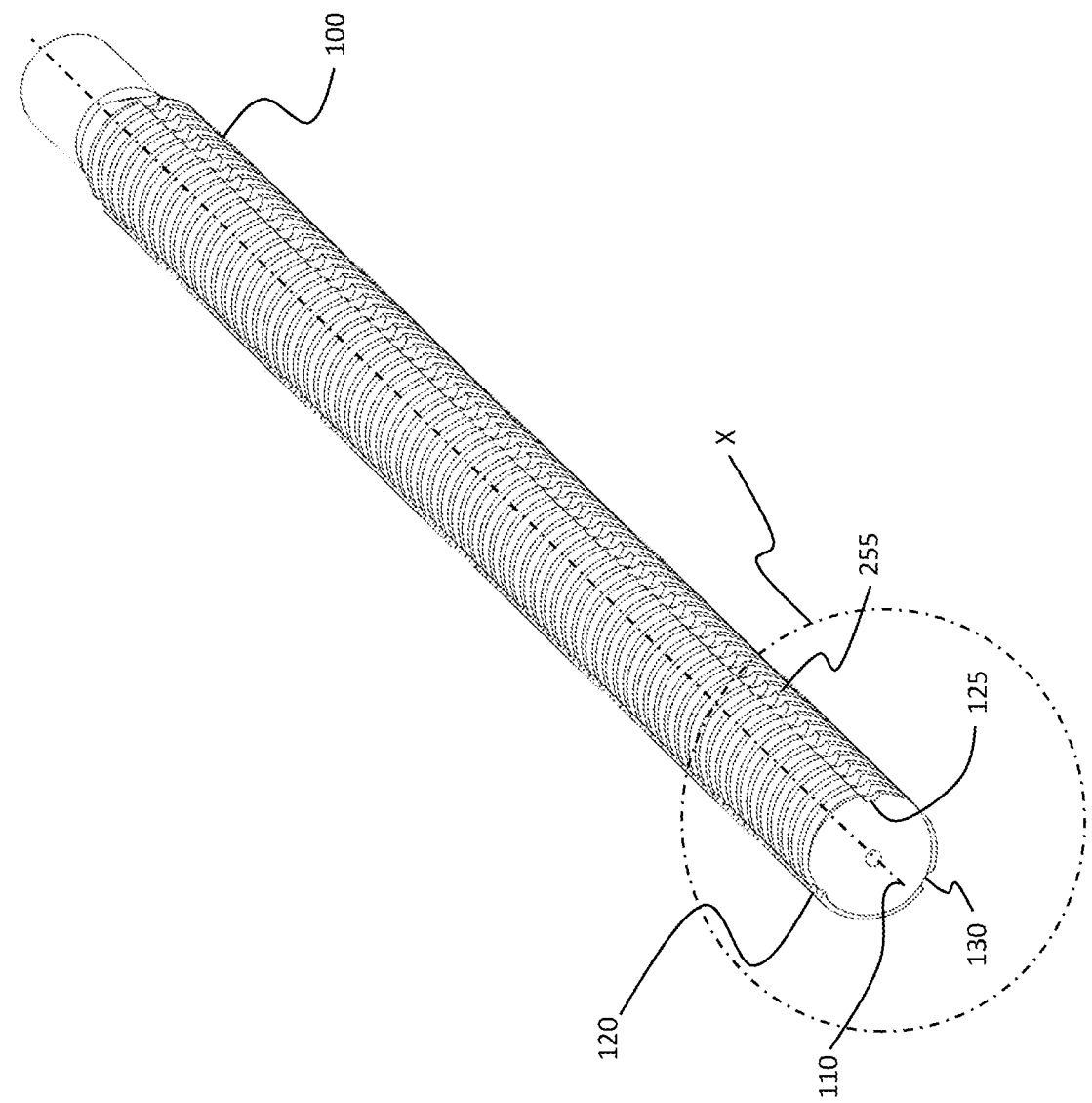
FIG. 7 shows a perspective view of a spindle shown in FIGS. 1 to 6.

FIG. 7 shows a perspective view of the spindle 100 shown in FIGS. 1 to 6.

In addition to the first to third spindle grooves 120, 125, 130, the spindle 100 also comprises the threaded groove 255 at the first outer circumferential side 115, wherein the threaded groove 255 is embodied to extend helically about the axis 110. The threaded groove 255 and the first to third spindle grooves 120, 125, 130 intersect at an angle. Preferably, the angle is 65° to 88°.

Figure 8:
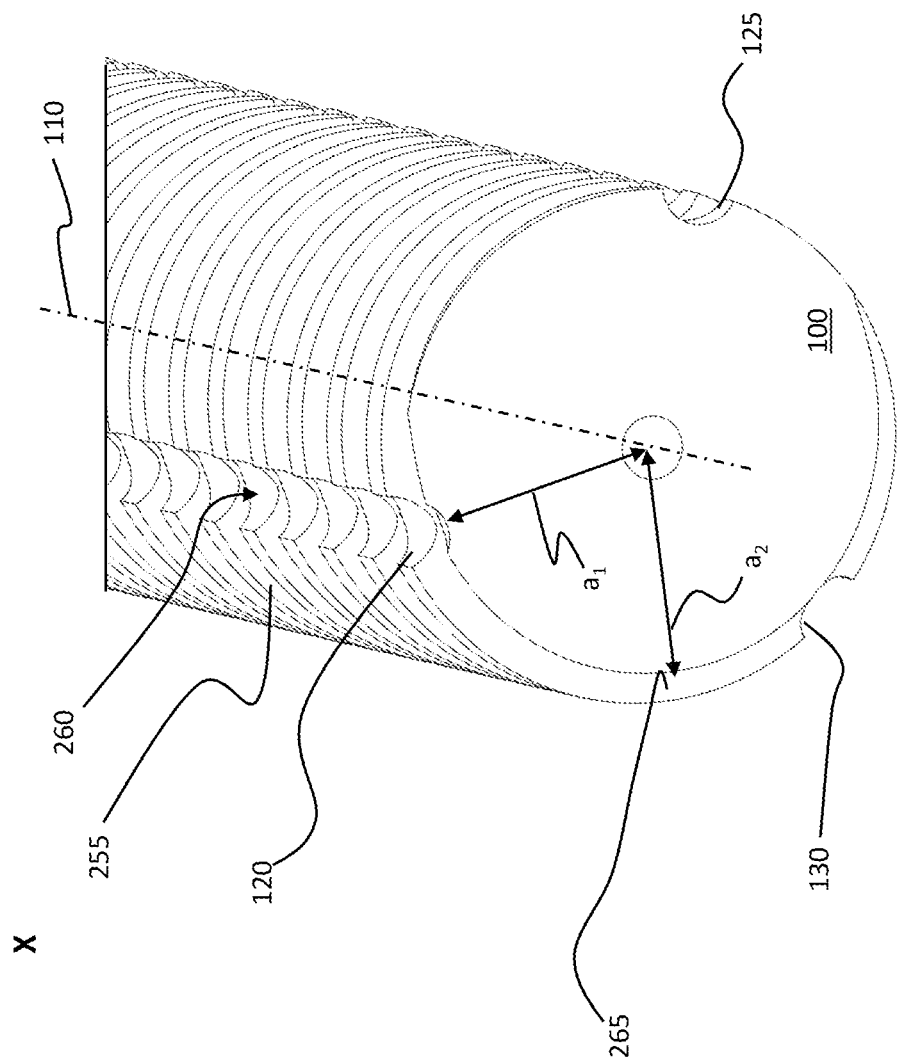
FIG. 8 shows a section X of the spindle shown in FIG. 7.

FIG. 8 shows a section X of the spindle 100 shown in FIG. 7.

The first to third spindle grooves 120, 125, 130 each have a spindle groove base 260. At the spindle groove base 260, the respective first to third spindle grooves 120, 125, 130 have a minimum first distance $a_1$ from the axis 110. The threaded groove 255 has a threaded groove base 265, the threaded groove base 265 comprising a second minimum distance $a_2$ from the axis 110. The threaded groove base 265 is arranged at a smaller second distance $a_2$ from the axis 110 than the spindle groove base 260 with the first distance $a_1$. This embodiment has the advantage that when the spindle nut 65 engages in the threaded groove 255, tilting of the spindle nut 65 at the first and/or second and/or third spindle groove 120, 125, 130 is prevented, so that reliable rotation of the spindle nut 65 about the axis 110 is ensured. Alternatively, the first distance $a_1$ and the second distance $a_2$ may be identical.

To assemble the linear system 10, the guide housing 135 and the first to third ledge elements 140, 155, 160 and the first and second spring elements 145, 150 and the system housing 45 are provided in a first assembly step.

In a second assembly step, the first and second spring elements 145, 150 are positioned in the respective associated first and second grooves 326, 330 in the guide housing 135.

In a third assembly step following the second assembly step, the carriers 190 of each of the first to third ledge elements 140, 155, 160 are inserted in the axial direction into the associated first to third receptacles 165, 170, 175, preferably from radially inward to radially outward.

An inner diameter of the first and second spring elements 145, 150 is selected such that in the untensioned state of the first and second spring elements 145, 150, the first and second spring elements 145, 150 rest on the outside of the ledges 190, but pull the first to third ledge elements 140, 155, 160 radially inward only to the extent that the respective supports 195 of the first to third ledge elements 140, 155, 160 remain in the respective associated first to third receptacles 165, 170, 175.

In a fourth assembly step following the third assembly step, the spindle 100 is inserted through the spindle passage 185 and the ledges 190 are threaded into the respective assigned first to third spindle grooves 120, 125, 130. In this process, the spindle 100 may be rotated back and forth relative to the guide housing 135 at a small angle in the circumferential direction about the axis 110. In doing so, depending on the embodiment of the first and second spring elements 145, 150, the first and second spring elements 145, 150 may be tensioned so that the sliding surface 215 of the ledge 190 rests against the respective associated first to third spindle grooves 120, 125, 130 or is pressed against by the first and second spring elements 145, 150.

Figure 9:
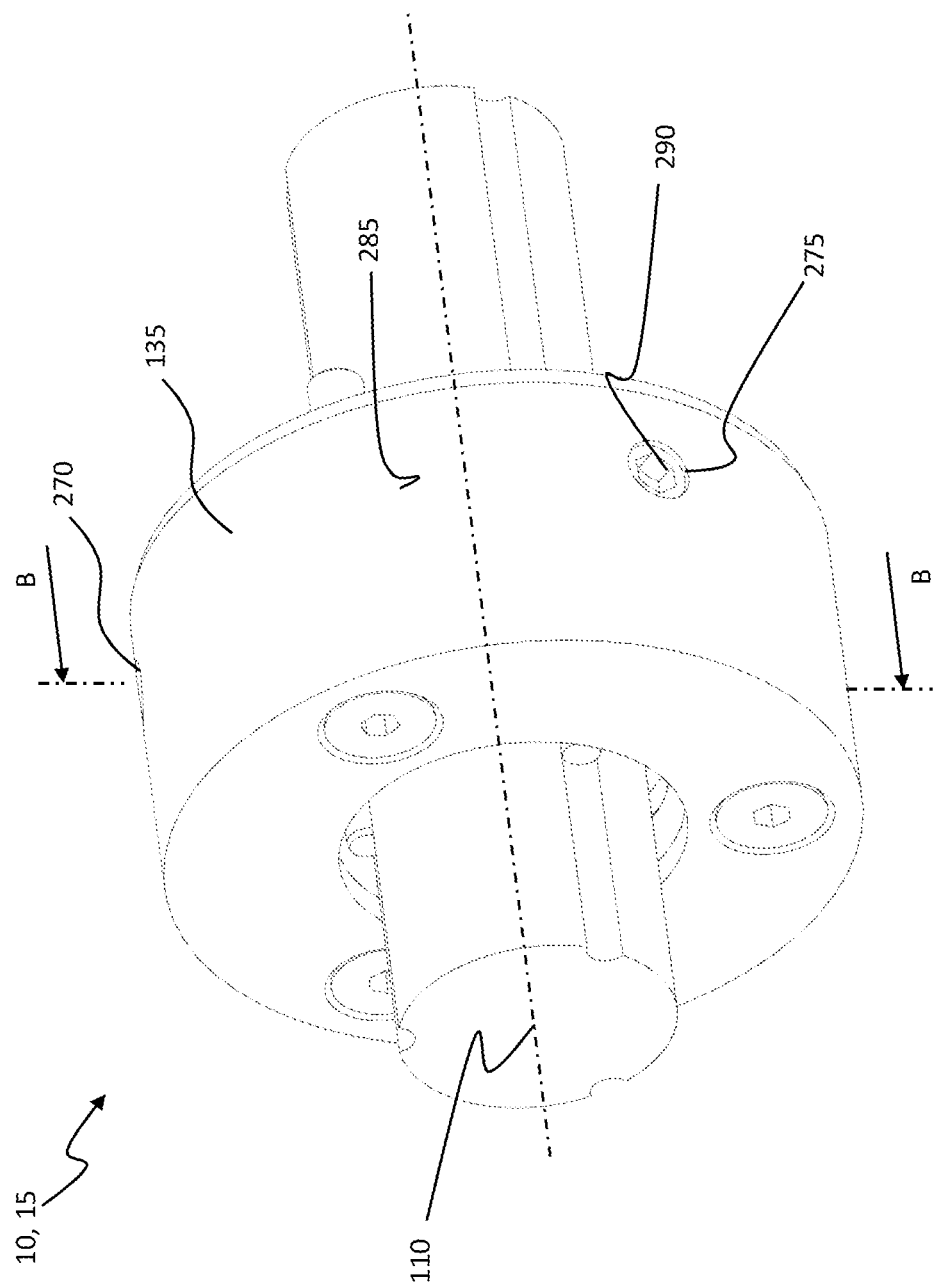
FIG. 9 shows a partial perspective view of a linear system according to a second embodiment.

In a fifth assembly step following the fourth method step, the linear guide 15 is mounted in the linear system 10 and the guide housing 135 is fastened to the system housing 45 with the fastener 520. The fastener 520 is mounted in such a way that the clamping force $F_S$ acts on the guide housing 135. The other components of the linear system 10 are mounted afterwards FIG. 9 shows a partial perspective view of a linear system 10 according to a second embodiment. For reasons of clarity, numerous components of the linear system 10, in particular the system housing 45, are shown in FIG. 1.

The linear guide 15 is essentially identical in embodiment to the linear guide 15 shown in FIGS. 1 to 8. In the following, only the differences between the linear guide 15 shown in FIG. 9 and the linear guide 15 shown in FIGS. 1 to 8 will be discussed.

The guide housing 135 comprises at least a first through-opening 270. Additionally, the guide housing 135 may have a second through-opening 275 and a third through-opening 280 that is covered in FIG. 9. The first through third through-openings 270, 275, 280 open onto the outer side of the housing 285 of the guide housing 135. A fixing element 290 is disposed in each of the first to third through-openings 270, 275, 280. The fixing element 290 may e.g. be embodied as a screw, in particular as a grub screw. Another embodiment of the fixing element 290, e.g. as a clamping body which engages with the respective associated first to third through-openings 270, 275, 280, would also be conceivable. In FIG. 9, the fixing element 290 is exemplarily inserted, preferably screwed, from radially outside to radially inside in the direction of the axis 110 into the respective associated first to third through-openings 270, 275, 280.

Figure 10:
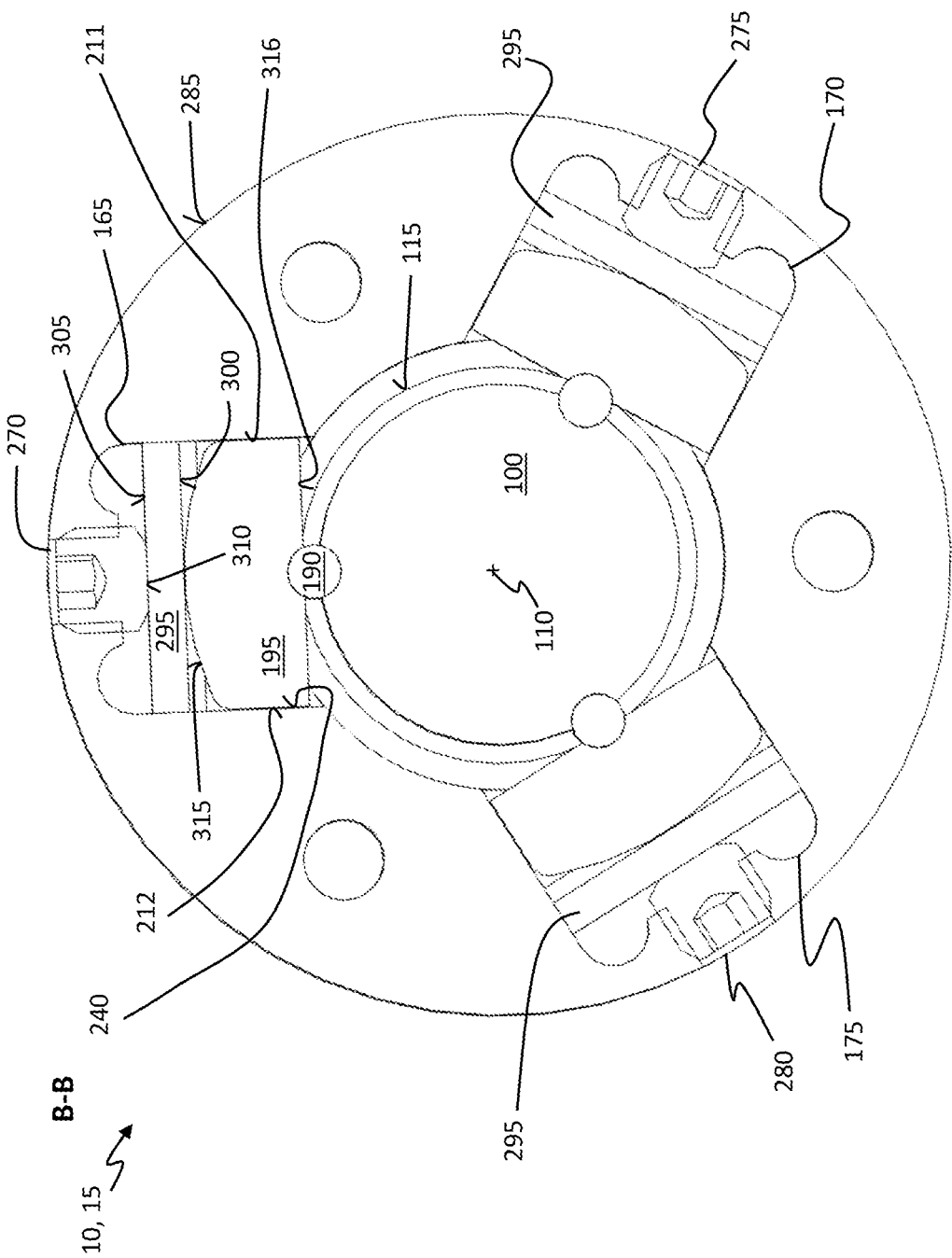
FIG. 10 shows a cross-sectional view along a sectional plane B-B shown in FIG. 9 through the linear system shown in FIG. 9.

FIG. 10 shows a sectional view along a sectional plane B-B shown in FIG. 9 through the linear system 10 shown in FIG. 9.

The first through-opening 270 extends radially inwardly from the outer side of the housing 285 in the direction of the axis 110. Radially inwardly, the first through-opening 270 opens into the first receptacle 165. In this case, the first through-opening 270 is e.g. configured to be shorter in the radial direction than the first receptacle 165.

The second through-opening 275 and the second receptacle 170 as well as the third through-opening 280 and the third receptacle 175 are arranged and embodied identically to the embodiment of the first through-opening 270 and the first receptacle 165, respectively, so that reference is made to the first through-opening 270 and the first receptacle 165, respectively, in this regard.

The linear guide 15 additionally comprises a pressure plate 295. The pressure plate 295 has a first abutment surface 300 radially on the inside on a side facing the axis 110.

The first abutment surface 300 is curved, preferably convex. The carrier 195 comprises a second abutment surface 315 on a side facing away from the axis 110. The second abutment surface 315 is curved, preferably concave. Preferably, the curvature has a center of curvature arranged on the axis 110. It is particularly advantageous in this context if the second abutment surface 315 is partially ball-shaped or spherical.

The pressure plate 295 comprises a third abutment surface 305 on a side facing away from the axis 110 and arranged radially outward. The third abutment surface 305 extends essentially in a plane and is flat. The third abutment surface 305 is oriented tangentially to a circular path about the axis 110. In the assembled state of the linear guide 15, the fixing element 290 rests against the third abutment surface 305 with a contact surface 310 arranged radially on the inside, preferably in a planar or linear or punctiform manner. The flat or linear abutment of the contact surface 310 against the third abutment surface 305 prevents tilting of the pressure plate 295 when the fixing element 290 is screwed into the first through-opening 270.

In the embodiment, the carrier 195 is embodied to be significantly wider in the circumferential direction than the ledge 190. Thus, in the circumferential direction, the carrier 195 projects beyond the ledge 190. It is of particular advantage here if a width of the carrier 195 in the circumferential direction is selected to be so wide that the carrier 195 is arranged completely in the first receptacle 165 and does not project radially on the inside beyond the first receptacle 165. An inner side 316 of the carrier 195 is thereby oriented tangentially to a circular path that extends around the axis 110. This embodiment has the advantage of avoiding contact of the inner side 316 with the first outer circumferential side 115 of the spindle 100.

Figure 11:
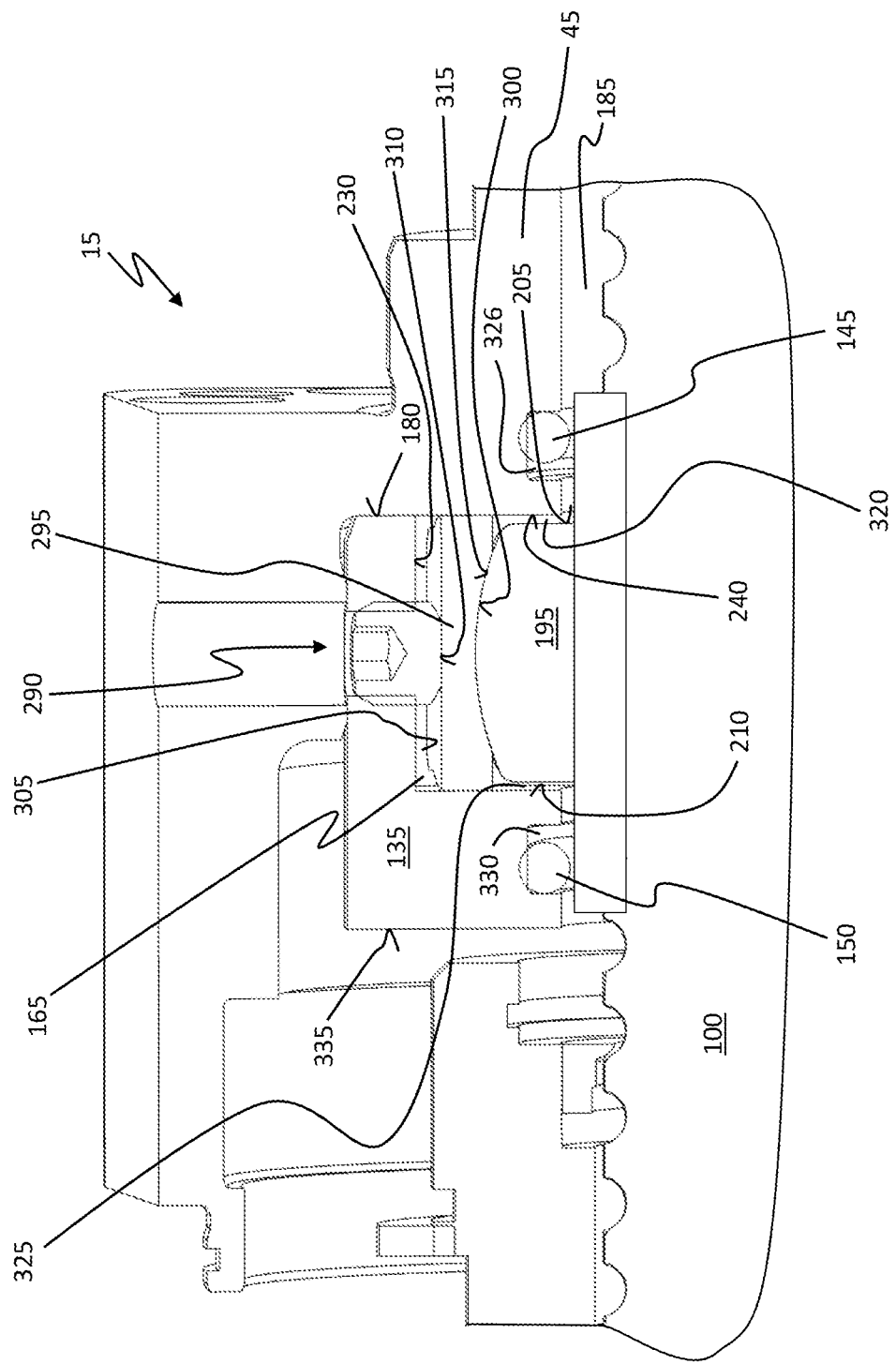
FIG. 11 shows a longitudinal section along the axis through the linear system shown in FIGS. 9 and 10.

FIG. 11 shows a longitudinal section along axis 110 through the linear system 10 shown in FIGS. 9 and 10.

At the first front face 180 of the guide housing 135, the system housing 45 abuts on the linear guide 15.

The second abutment surface 315 substantially comprises a line contact or a surface contact at the first abutment surface 300, the line contact being e.g. parallel to the axis 110.

On the circumferential side, the pressure plate 295 rests against the first inner circumferential side 240 of the first receptacle 165 so that, in the radial direction, the pressure plate 295 may be displaced without tilting in the first receptacle 165 by the fixing element 290 or the carrier 195.

Compared to the embodiment shown in FIGS. 1 to 8, a first axial gap 320 is formed between the second front face 205 and the first inner circumferential side 240, and a second axial gap 325 is embodied between the third front face 210 and the first inner circumferential side 240.

In the circumferential direction, the carrier 195 abuts on the first inner circumferential side 240 with the first side surface 211 and/or the second side surface 212, so that the counter torque $M_G$ is reliably supported at the first inner circumferential side 240. The first and second axial gaps 320, 325 prevent jamming of the first ledge element 140 during assembly of the linear guide 15. Furthermore, overdetermination of the linear guide 15 is avoided. Thus, the axial positioning of the first ledge element 140 in the first receptacle 165 is performed exclusively via the line contact between the second abutment surface 315 and the first abutment surface 300. This embodiment has the advantage that the first ledge element 140 may support the counter-torque $M_G$ and radial forces acting outwardly in the radial direction. The linear guide 15 preferably functions mechanically as a pure pivot joint. Thus, it is insensitive to tilting at right angles to the axis 110.

In order to assemble the linear guide 15 shown in FIGS. 9 to 11, FIGS. 9 to 11 are described in conjunction below.

The assembly method is substantially identical to that for assembling the linear system 10 shown in FIGS. 1 to 8. The following discussion will focus exclusively on the differences with regard to the method shown in FIGS. 1 to 8.

In the first assembly step, the first through third through-openings 270, 275, 280 may be open. Additionally, the same number of fixing elements 290 and first to third through-openings 270, 275, 280 are provided.

In the second assembly step, which follows the first method step, the first spring element 145 is inserted into the first groove 326 and the second spring element 150 is inserted into the second groove 330.

In addition, in the third assembly step, before the carrier 195 is inserted into the respectively assigned first to third receptacles 165, 170, 175, a pressure plate 295 is inserted into the first to third receptacles 165, 170, 175 in such a way that the curved first abutment surface 300 is arranged on the side facing the axis 110. Afterwards, the carriers 195 of the first to third ledge elements 140, 155, 160 are inserted into the respective associated first to third receptacles 165, 170, 175.

The pressure plate 295 is e.g. pushed radially outward until the pressure plate 295 abuts on the receptacle base 230 of the first receptacle 165. A pressure plate 295 is also inserted into the second receptacle 170 and the third receptacle 175 in an identical manner as just described.

In the embodiment, the fourth and fifth assembly steps are interchanged so that first the guide housing 135 with the first to third ledge elements 140, 155, 160 is inserted into the system housing 45 and connected, e.g. screwed, to the system housing 45. Then, the spindle 100 is inserted into the linear system 10 through the linear guide as described above in the fourth assembly step.

In an additional, sixth assembly step following the fifth assembly step, a fixing element 290 is fitted, e.g. screwed, into each of the first to third to openings 270, 275, 280. The provision of the clamping force $F_S$ and the counterforce $F_G$ is dispensed with, wherein the position of the first ledge element 140 relative to the guide housing 135 is defined via the pressure plate and the fixing element 290.

In this case, the fixing element 290 is moved radially inwards, e.g. screwed in, in each of the first to third through-openings 270, 275, 280 until the contact surface 310 rests against the third abutment surface 305 without clearance but without tension. At the same time, in this state, the first abutment surface 300 is in substantially clearance-free and force-free contact with the second abutment surface 315.

In the same way, the sliding surface 215 is in clearance-free contact with the respective associated first to third spindle grooves 120, 125, 130.

The fixing element 290 may be secured against unintentional loosening, e.g. with a screw locking agent. Also, a counter screw may be screwed into the first to third through-openings 270, 275, 280 from radially outside to secure the fixing element 290, which is in the form of a grub screw.

Figure 12:
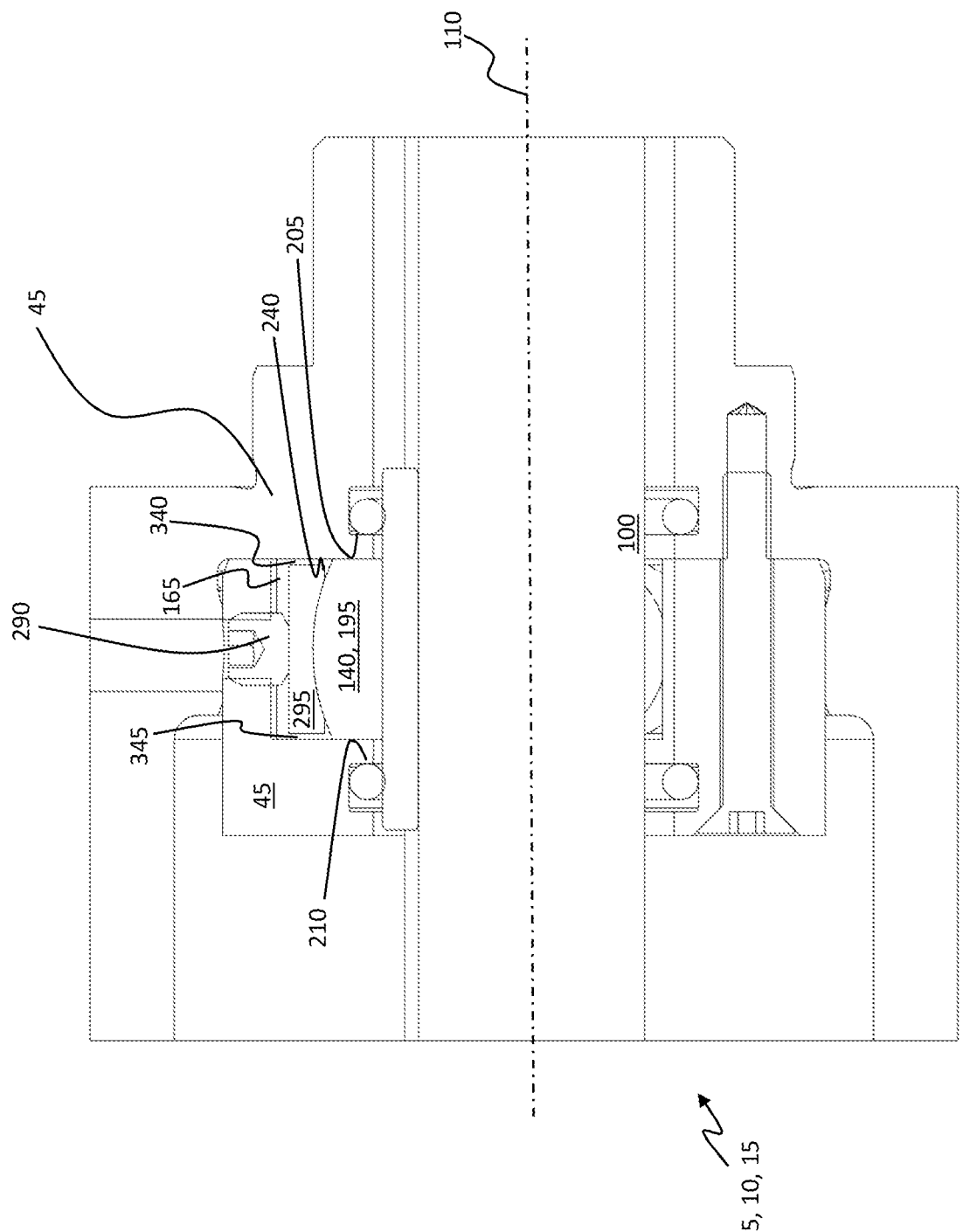
FIG. 12 shows a detail of a longitudinal cross-section along the axis through a linear system according to a third embodiment.

FIG. 12 shows a section of a longitudinal cross-section through a linear system 10 according to a third embodiment.

The linear system 10 is substantially identical in embodiment to the linear system 10 shown in FIGS. 9 to 11. In the following, only the differences between the third embodiment of the linear system 10 shown in FIG. 12 and the second embodiment of the linear system 10 shown in FIGS. 9 to 11 will be discussed.

In FIG. 12, the pressure plate 295 is embodied shorter in the axial direction relative to the axis 110 than shown in FIGS. 9 to 12, so that a third axial gap 340 is disposed in the axial direction between the first inner circumferential side 240 and the pressure plate 295. Furthermore, a fourth axial gap 345 is arranged between the system housing 45 and the pressure plate 295 on the front face. The third and fourth axial gaps 340, 345 prevent overdetermination of the linear guide 15.

Furthermore, the carrier 195 lies circumferentially against the first inner circumferential side 240, and in particular, differing from FIGS. 9 to 12, against the third front face 210 on the first inner circumferential side 240, as well. The second front face 205 abuts the system housing 45, which closes the first receptacle 165 at the front face. This prevents the carrier 195, and thus the first ledge element 140, from tilting in the first receptacle 165. The carrier 195 is preferably guided in the first receptacle 165 in the axial direction only and in the circumferential direction, but is not braced in the first receptacle 165 by the fastener 520. The carrier 165 of the first ledge element 140 may thus be moved in a radial direction from radially inward to outward and back in the first receptacle 165 when the fixing element 290 is loosened or disassembled. This embodiment is particularly suitable when no or only a small bending moment from the spindle 100 is to be supported with the linear guide 15. This embodiment avoids an overdetermination, so that a simplified assembly or adjustment is possible.

In the assembled state, the fixing element 290 secures the radial position of the first ledge element 140 in the first receptacle 165 in the radial direction via the pressure plate 295. In particular, the fixing element 290 may be used to define the contact of the ledge 190 in the associated spindle groove 120.

Figure 13:
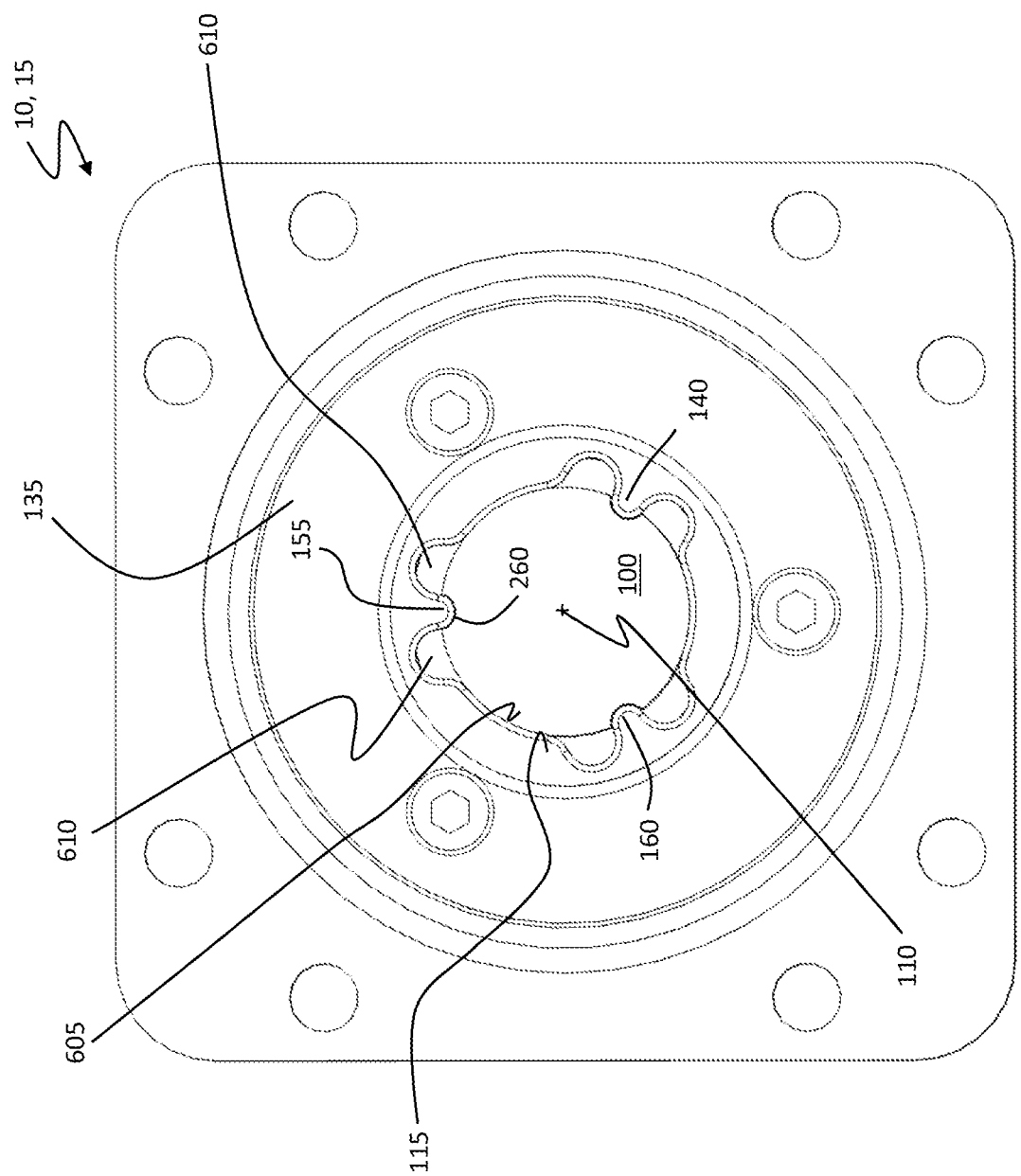
FIG. 13 shows a top view of a linear guide of a linear system according to a fourth embodiment.

FIG. 13 shows a top view of the linear guide 15 of a linear system 10 according to a fourth embodiment.

In FIG. 13, essentially only the linear guide 15 is shown for clarity reasons. The linear system 10 is essentially identical to the linear system 10 shown in FIGS. 1 to 8. In the following, only the differences between the linear system 10 shown in FIG. 13 and the linear system 10 shown in FIGS. 1 to 8 will be discussed.

The guide housing 135 and the first to third ledge elements 140, 155, 160 are embodied integrally and of the same material. An indentation 610 may be formed on both sides of each of the first to third ledge elements 140, 155, 160. The indentation 610 has a groove-shaped embodiment and directly adjoins the first to third ledge elements 140, 155, 160 in each case in the circumferential direction. The indentation 610 prevents the spindle 100 from catching on the first to third ledge elements 140, 155, 160. The indentation 610 allows the guide housing 135 to be created by machining.

The guide housing 315 further comprises a guide surface 605 radially inwardly extending circumferentially between each of two adjacent circumferentially disposed indentations 610. The guide surface 605 extends on a circular path around the axis 110. The guide surface 605 is embodied to rest against the first outer circumferential side 115 of the spindle 100 to support radial forces from the spindle 100. It is advantageous here if the spindle groove base 260 is arranged at a distance from the respective associated first to third ledge elements 140, 155, 160.

Alternatively, a gap may be disposed between the guide surface 605 and the first outer circumferential side 115 and between the first through third ledge elements 140, 155, 160 and the spindle groove base 260.

Figure 14:
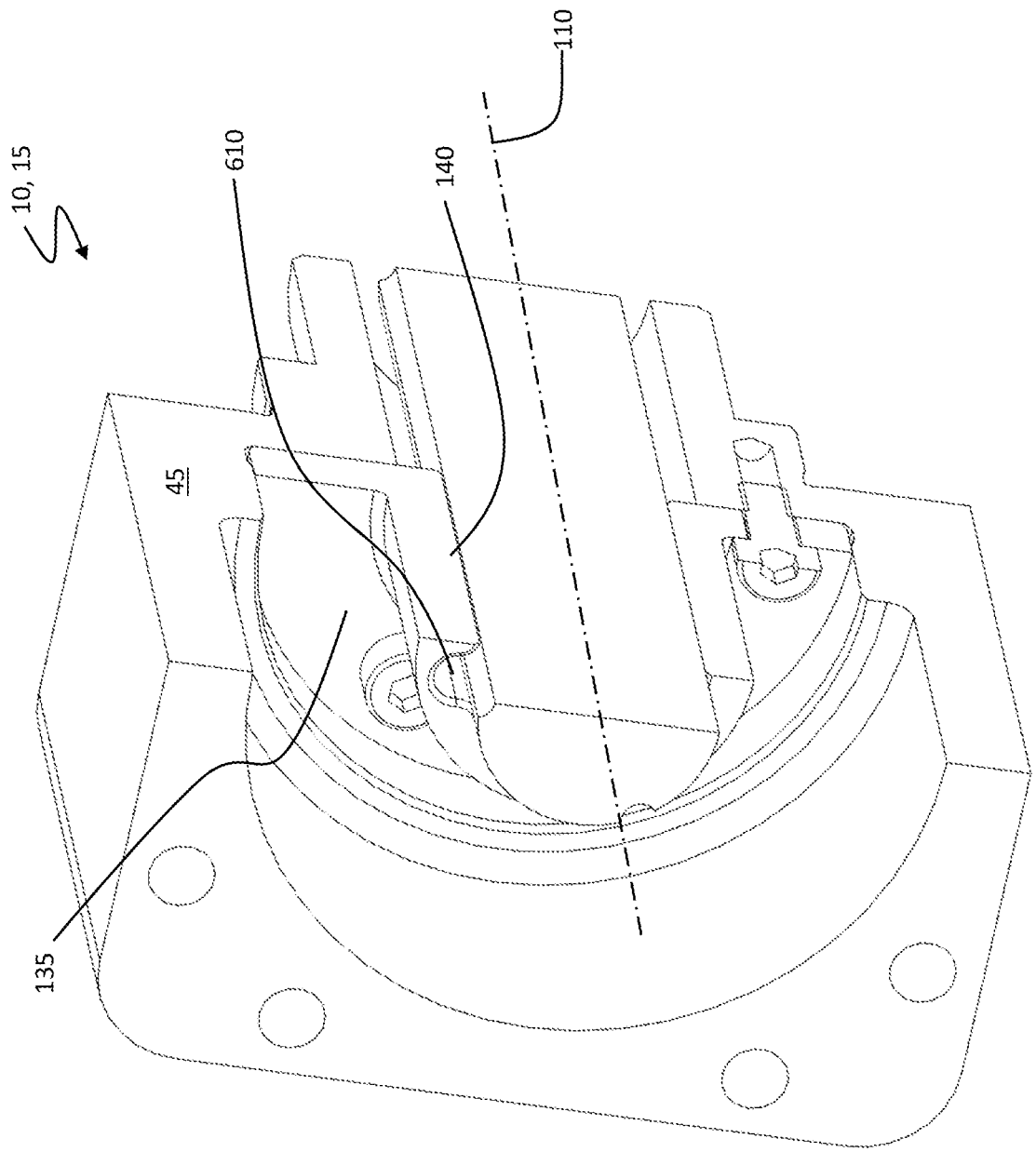
FIG. 14 shows a perspective sectional view through a linear system according to the fourth embodiment shown in FIG. 13.

FIG. 14 shows a perspective longitudinal section along the axis 110 shown in FIG. 13 through the linear system 10 shown in FIG. 13.

The guide housing 135 is screwed to the system housing 45. The indentation 610 extends in parallel to the axis 110 and substantially along an entire axial extent of the guide housing 135. The first to third ledge elements 140, 155, 160 have a substantially identical width with regard to the guide housing 135. Furthermore, the spring elements 145, 150 and the first and second grooves 326, 330 are omitted.

Figure 15:
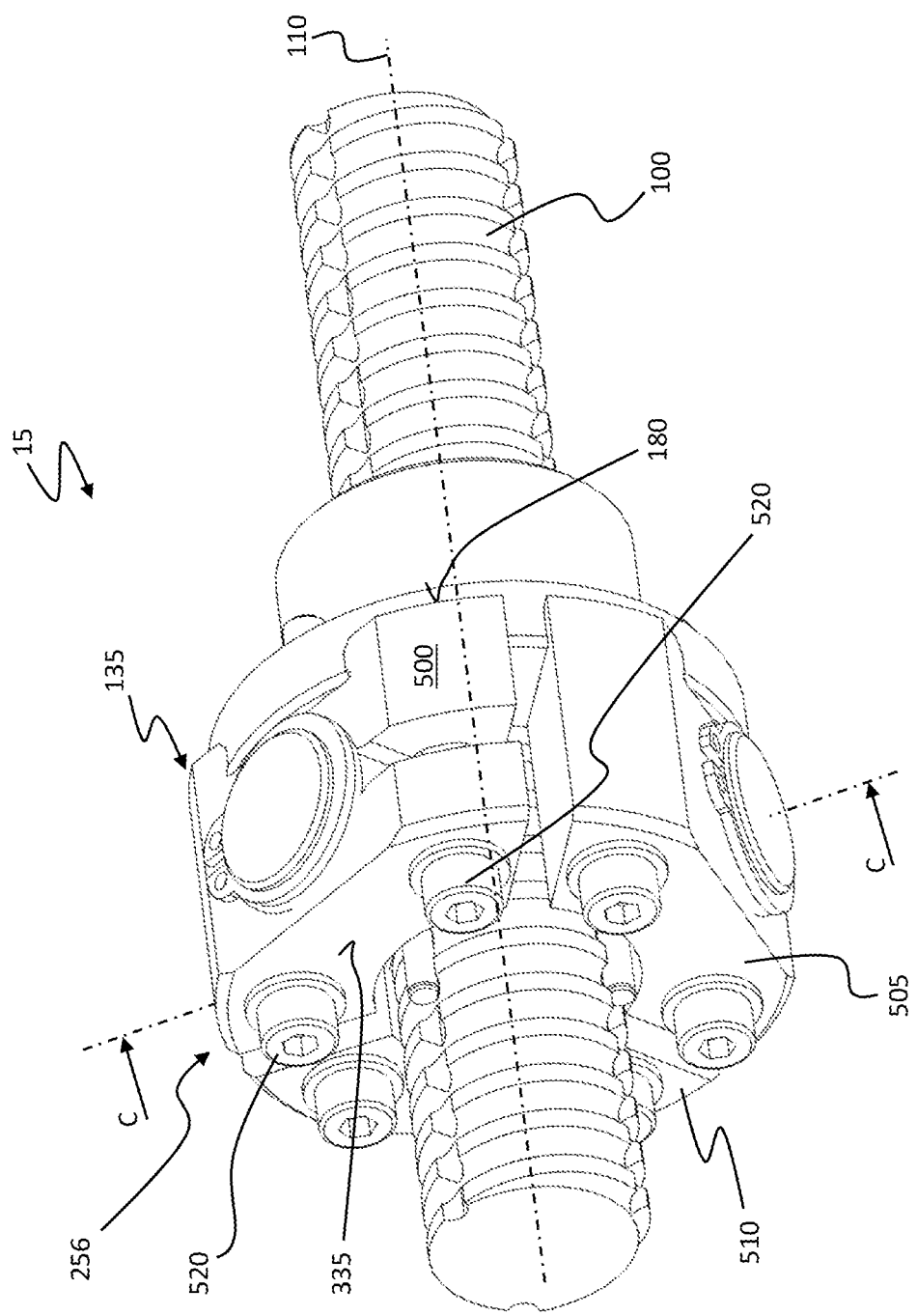
FIG. 15 shows a perspective view of a linear system according to a fifth embodiment.

FIG. 15 shows a perspective view of a linear system 10 according to a fifth embodiment.

The linear system 10 is substantially identical to the linear system 10 shown in FIGS. 1 to 8. In the following, only the differences between the linear system 10 shown in FIG. 15 and the linear system 10 shown in FIGS. 1 to 8 will be discussed.

In the embodiment, the guide housing 135 is embodied in multiple parts. Thus, the guide housing 135 comprises a first housing element 500 and at least one second housing element 505. In addition, the guide housing 135 may also have a third housing element 510 arranged substantially concealed in FIG. 15. At the first front face 180, in the assembled state of the guide housing 135 in the system housing 45, the first to third housing elements 500, 505, 510 abut the system housing 45 on a side facing the second end 85.

The first to third housing elements 500, 505, 510 are each spaced apart from each other in the circumferential direction. The first to third housing elements 500, 505, 510 are each connected to the system housing 45 by the fastener 520.

The fastener 520 may e.g. comprise a pair of screws extending in parallel to the axis 110. The screws may be internally screwed into the system housing 45 to respectively secure the first through third housing elements 500, 505, 510 in pairs.

Figure 16:
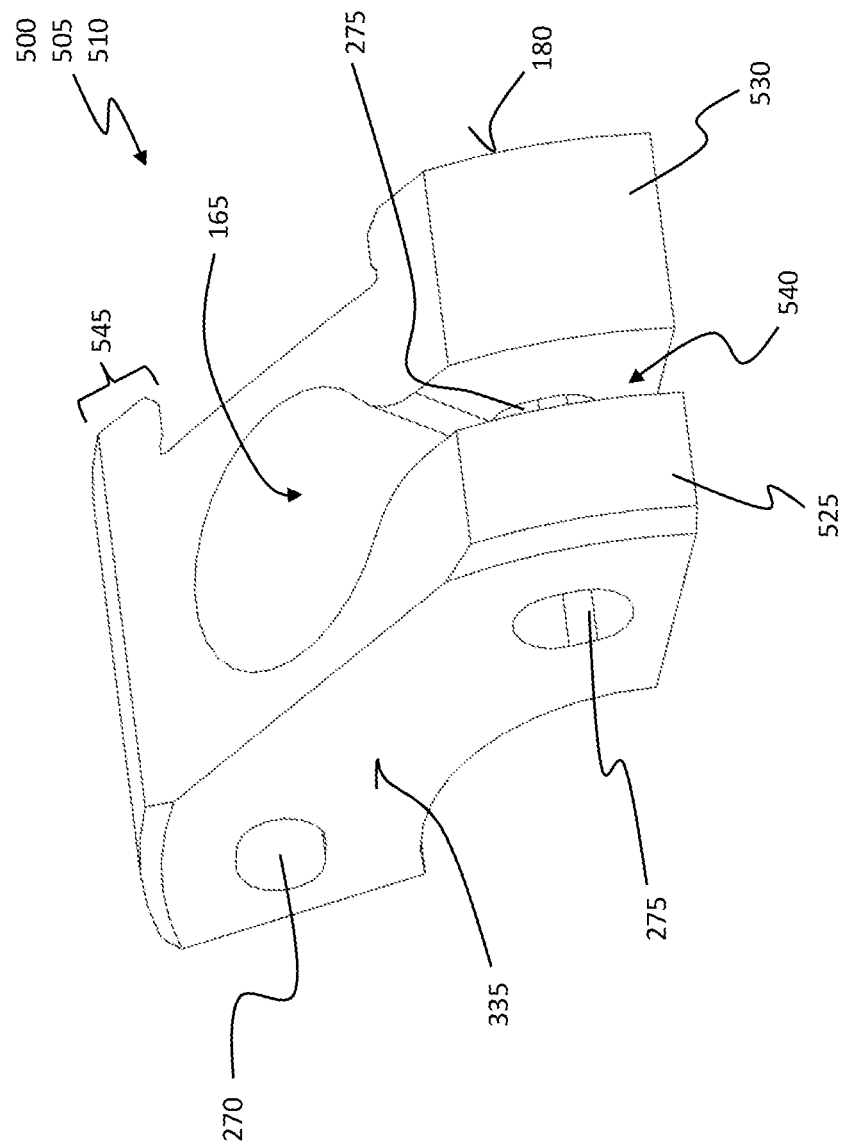
FIG. 16 shows a perspective view of first through third housing elements.

FIG. 16 shows a perspective view of the first to third housing elements 500, 505, 510.

The first to third housing elements 500, 505, 510 are embodied identically to one another, so that what is explained below for the first housing element 500 also applies analogously to the second or third housing elements 505, 510.

The first housing element 500 comprises a first leg 525 and an axially opposite second leg 530. In the assembled state, the first leg 525 is arranged on a side facing the first end 51 of the system housing 45. The second leg 530 is arranged on a side facing the second end 85 of the system housing 45. Thereby, the second leg 530 has the first front face 180. The fourth front face 335 is arranged on the first leg 525.

The first leg 525 and the second leg 530 each extend in planes axially offset from each other and perpendicular to the axis 110. The first leg 525 and the second leg 530 extend substantially in the circumferential direction. The first receptacle 165 is arranged between the first leg 525 and the second leg 530. Adjacent to the first receptacle 165 is a fifth axial gap 540 that extends in the circumferential direction. On a side facing away from the fifth axial gap 540 in the circumferential direction, the first housing element 500 has a connecting section 545. The connecting section 545 extends along the entire axial extension of the first housing element 500 and connects the first leg 525 to the second leg 530. The connecting section 545 circumferentially delimits the first receptacle 165 on a side facing away from the fifth axial gap 540.

The first through-opening 270 extends through the connecting section 545. On a side facing away from the connecting section 545 in the circumferential direction, the first housing element 500 comprises the second through-opening 275, which is embodied in two parts and extends through both the first leg 525 and the second leg 530. The first and second through-openings 270, 275 are circumferentially arranged on either side of the first receptacle 165. In the embodiment, the second through-opening 275 is interrupted by the fifth axial gap 540.

Figure 17:
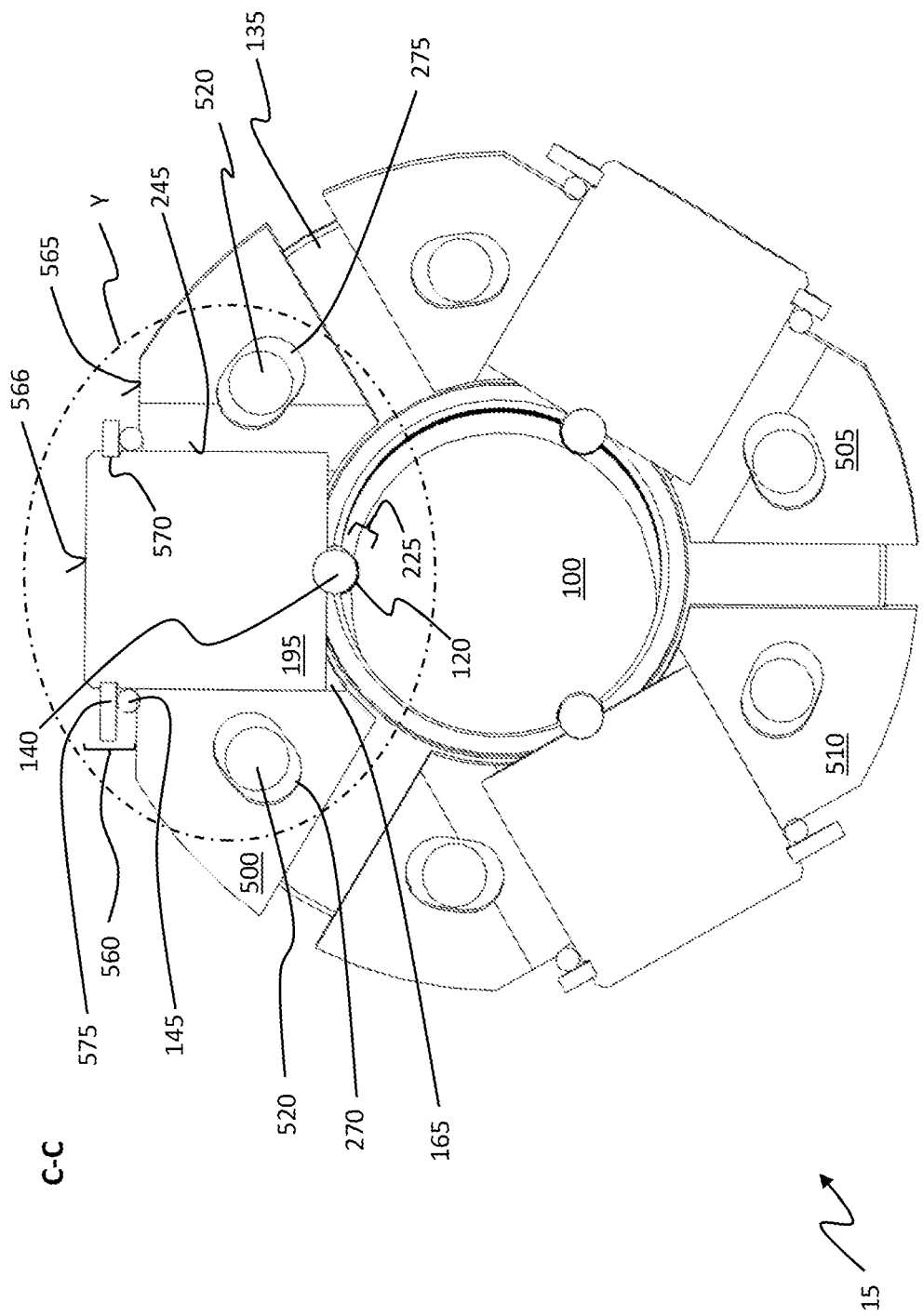
FIG. 17 shows a sectional view along a sectional plane C-C shown in FIG. 15 through the linear system shown in FIG. 15.

FIG. 17 shows a sectional view along a sectional plane C-C shown in FIG. 15 through the linear system 10 shown in FIG. 15.

In the embodiment, the carrier 195 is wider in the radial direction compared to the embodiment shown in FIGS. 1 to 8. In this case, the carrier 195 projects radially outwardly with a third partial section 560 beyond an outer side 565 of the respective first to third housing elements 500, 505, 510. The outer side 566 of the carrier is arranged radially outside of the outer side 565 of the first housing element 500.

The first and second through-openings 270, 275 may be embodied as a bore or as an elongated bore extending in the circumferential direction. The fastener 520 is inserted through the first through-opening 270 and the second through opening 275.

Figure 18:
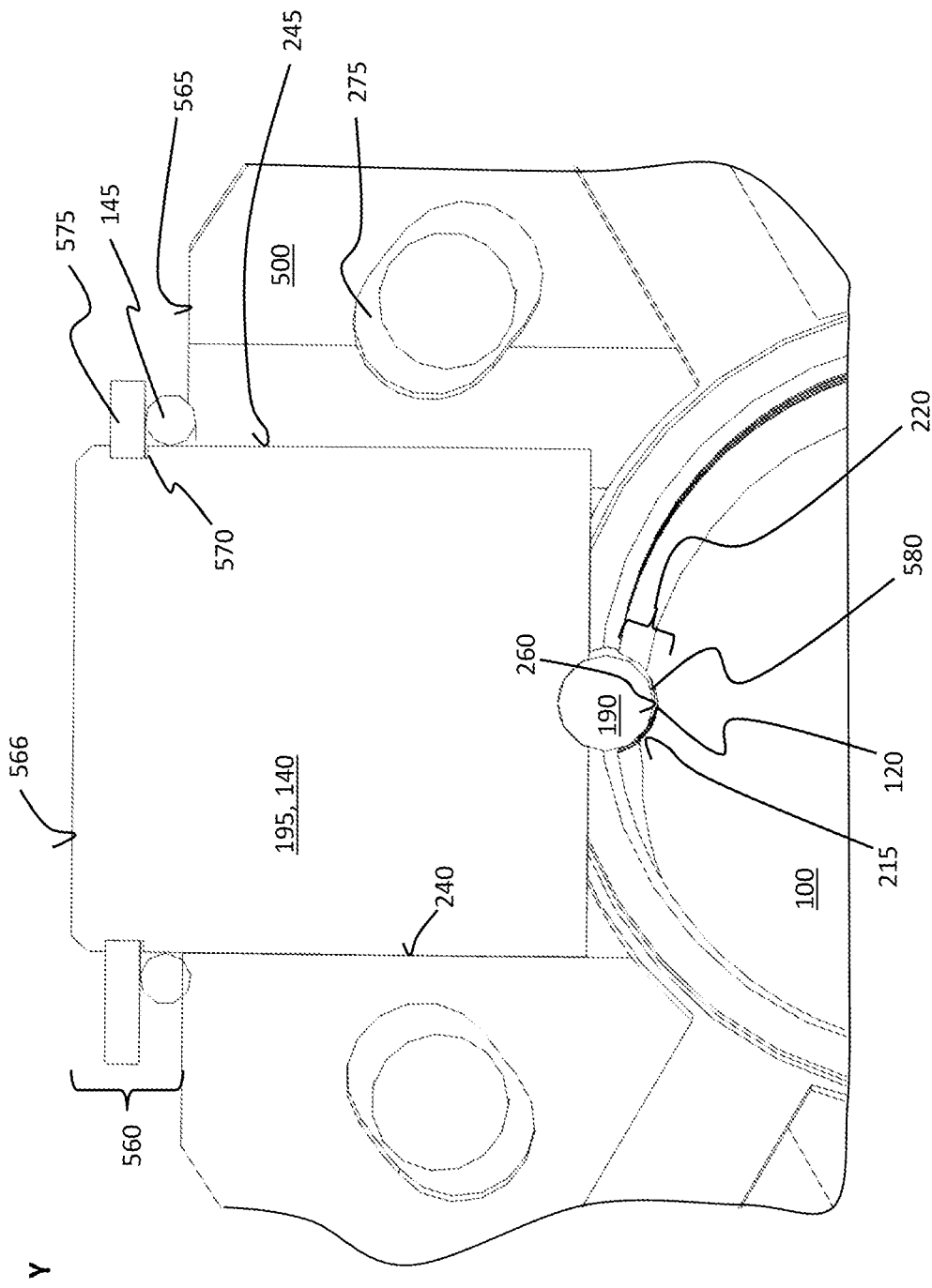
FIG. 18 shows a section Y, marked in FIG. 17, of the sectional view shown in FIG. 17 along the sectional plane C-C shown in FIG. 1.

FIG. 18 shows a section Y of the sectional view shown in FIG. 177 along the section plane C-C shown in FIG. 15.

At the third partial section 560, the carrier 195 comprises a securing groove 570 embodied circumferentially at the carrier 195. The securing groove 570 is arranged in a radial direction between the outer surface 565 and the outer surface 566 of the carrier.

In a side view of the carrier 195, the carrier 195 has an exemplary cylindrical configuration. A support ring 575 engages in the securing groove 570. The support ring 575 projects laterally beyond the second outer circumferential side 245 of the carrier 195 and is spaced apart in a radial direction from the outer side 565 of the first housing element 500. In the radial direction, the first spring element 145 is arranged between the support ring 575 and the outer surface 565. The first spring element 145 circumferentially engages around the carrier 195 and rests against the carrier 195. A radial distance between the outer side 565 and the support ring 575 is selected such that the first spring element 145 abuts against both the support ring 575 and the outer side 565.

The first spring element 145 ensures that the first portion 220 of the ledge 190 that engages with the first spindle groove 120 is spaced apart from the first spindle groove 120. That is, a gap 580 is disposed between the sliding surface 215 and the first spindle groove 120. For example, the gap 580 may have a maximum width of 0.005 mm to 0.1 mm. This embodiment ensures that jamming of the linear guide 15 on the spindle 100 is prevented by the gap 580. Furthermore, wear is reduced because, compared to the embodiment shown in FIGS. 1 to 13, the sliding surface 215 is in contact with the associated spindle groove 120, 125, 130 only when the frictional torque $M_R$ is introduced into the spindle 100.

Figure 19:
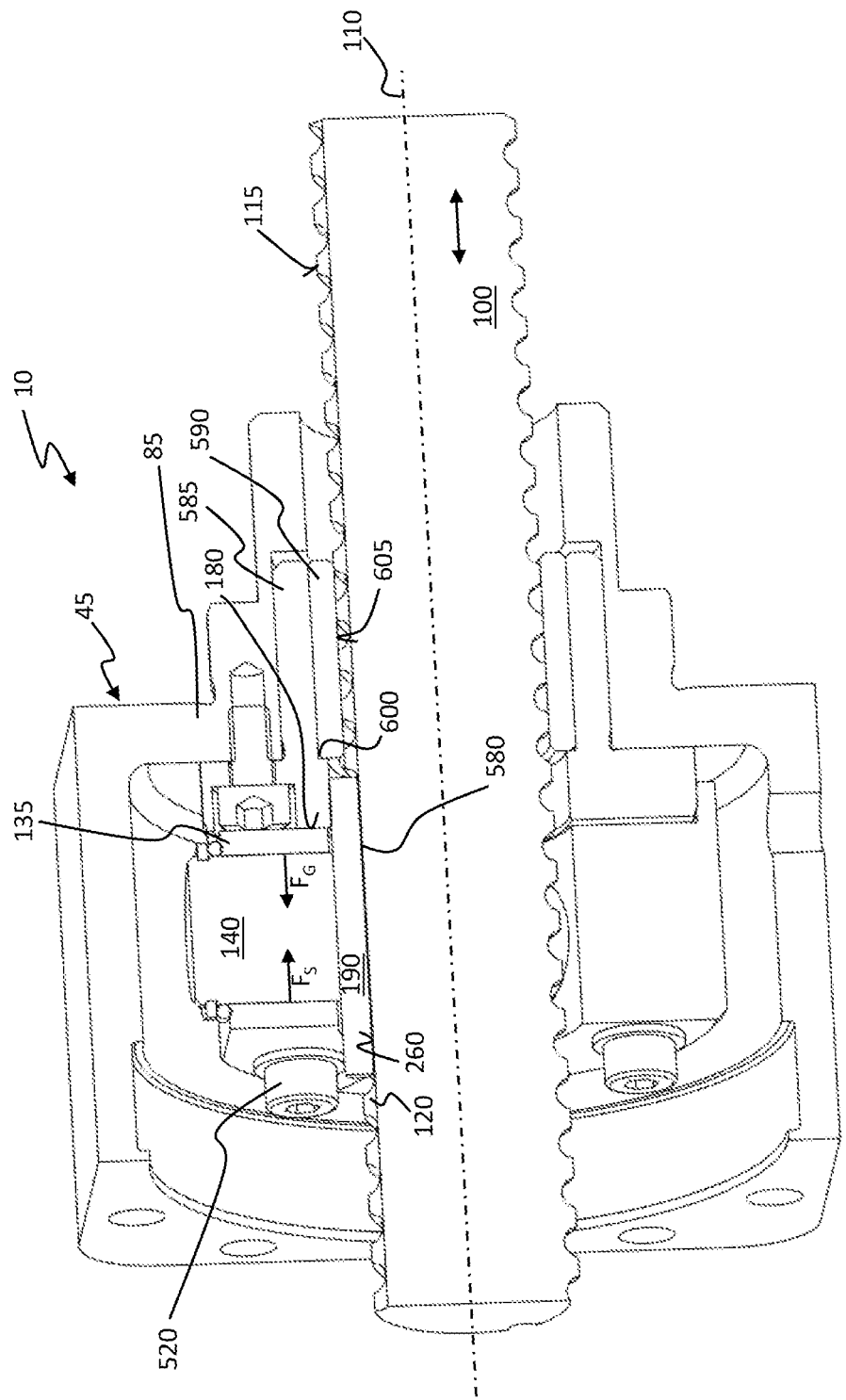
FIG. 19 shows a detail of a longitudinal cross-section through the linear system shown in FIGS. 15 to 18.

FIG. 19 shows a section of a longitudinal cross-section through the linear system 10 shown in FIGS. 15 and 16.

The linear guide 15 additionally comprises a retainer 585 and a guide sleeve 590. The retainer 585 is L-shaped in a half-longitudinal section. The retainer 585 is furthermore embodied rotation-symmetrically about the axis 110. The retainer 585 is connected to the system housing 45 on the inside of the system housing 45.

The guide sleeve 590 is arranged radially inwardly at the retainer 585 in a recess 600 of the retainer 585. The guide sleeve 590 may e.g. comprise a copper alloy. The guide sleeve 590 comprises a hollow-cylindrical shape and rests on the outside of the retainer 585. On the inside, the guide sleeve 590 has the guide surface 605 extending in parallel to the axis 110. The guide sleeve 590 engages around the circumference of the spindle 100. The spindle 100 always completely engages through the guide sleeve 590, regardless of its axial position.

The guide surface 605 abuts on the first outer peripheral surface 115 of the spindle 100. The guide surface 605 supports a radial force from the spindle 100 at the retainer 585. In order to prevent axial displacement of the guide sleeve 590, the guide sleeve 590 may be materially connected radially outwardly to the retainer 585. The retainer 585 may comprise a heat-treatable steel. The guide sleeve 590 is arranged axially spaced apart from the ledge 190 of the first ledge element 140.

In the axial direction, the first front face 180 rests against the retainer 585. For fastening and providing the clamping force $F_s$ or the counterforce $F_G$, respectively, the fastener 520 may engage through the retainer 585 or be screwed into the retainer 585 so as to fasten the guide housing 135 to the system housing 45.

The assembly method is embodied to be essentially identical to the assembly method explained in FIGS. 1 to 8. In the following, only the differences of the assembly method for assembling the linear system 10 shown in FIGS. 15 to 19 compared to the assembly method described in FIGS. 1 to 8 will be discussed.

In the third method step, the carrier 195 is inserted through the first receptacle 165 from radially inward to radially outward until the third partial section 560 protrudes beyond the outer surface 565.

The second assembly step described in FIGS. 1 to 8 is performed following the third assembly step. In this step, the first spring element 145 is pushed onto the third partial section 560 until the first spring element 145 is in contact with the outer surface 565.

Then, the support ring 575 is inserted into the securing groove 570 so that the first spring element 145 is supported on the support ring 575 as well as on the outer side 565.

In the fourth process step, the spindle 100 is additionally inserted through the guide sleeve 590.

In the fifth method step, the fastener 520 is guided through the first and second through-openings 270, 275 and, when the fastener 520 is embodied as a screw, is tightened. As a result, the first inner circumferential side 240 of the first receptacle 165 is pressed against the second outer circumferential side 245 with the clamping force $F_s$, acting in parallel to the axis 110, so that the second outer circumferential side 245 of the carrier 195 forms a frictional connection with the first inner circumferential side 240 of the first receptacle 165. As a result, in the radial direction, the carrier 195 of the first ledge element 140 is not displaceable with regard to the first housing element 500 and is positioned in a defined manner. Furthermore, the engagement of the first partial section with the first spindle groove 120 is defined and slipping of the ledge 190 out of the first spindle groove 120 is prevented.

The identical embodiment of the second housing element 505 and the third housing element 510 also defines the engagement of the ledge 190 of the second ledge element 155 and the third ledge element 160 in the respectively assigned second spindle groove 125 and third spindle groove 130.

The embodiment shown in FIGS. 15 to 19 has the advantage that the linear guide 15 may be adjusted particularly well, but at the same time may be mounted particularly easily. By foregoing freedom from play, in the embodiment the first to third spindle grooves 120, 125, 130 may have greater manufacturing tolerances than the first to third spindle grooves 120, 125, 130 shown in FIGS. 1 to 14.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

Reference numerals: 5-200

5 manufacturing system
10 linear system
15 linear guide
20 first bearing arrangement
25 drive unit
30 second bearing arrangement
35 contact device
40 rotary encoder
45 system housing
50 housing interior
51 first end
55 drive motor
56 rotor
60 stator
65 spindle nut
70 hollow shaft
75 screw connection
85 second end
90 connection section
100 spindle
105 spindle guide
110 axis
115 first outer circumferential side
120 first spindle groove
125 second spindle groove
130 third spindle groove
135 guide housing
140 first ledge element
145 first spring element
150 second spring element
155 second ledge element TABLE 1-continued Reference numerals: 5-200

160 third ledge element
165 first receptacle
170 second receptacle
175 third receptacle
180 first front face
185 spindle passage
190 ledge
195 carrier
200 fastening surface

TABLE 2

Reference numerals: 201-610

201 shell surface
205 second front face
210 third front face
211 first side surface
212 second side surface
215 sliding surface
220 first partial section
225 second partial section
230 receptacle base
235 third side surface
240 first inner circumferential side
245 second outer circumferential side
250 second inner circumferential side
255 threaded groove
257 component
260 spindle groove base
265 threaded groove base
270 first through-opening
275 second through-opening
280 third through-opening
285 housing outer side
290 fixing element
295 pressure plate
300 first abutment surface
305 third abutment surface
310 contact surface
315 second abutment surface
316 inner side
320 first axial gap
325 second axial gap
326 first groove
330 second groove
335 fourth front face
340 third axial gap
345 fourth axial gap
500 first housing element
505 second housing element
510 third housing element
520 fastener
525 first leg
530 second leg
540 fifth axial gap
545 connection section
560 third section
565 outer side
566 outer side of carrier
570 fastening groove
575 support ring
580 gap
585 retainer
325 second axial gap
590 guide sleeve
595 further fastener
600 recess
605 guide surface

What is claimed is:

1. A linear system for a manufacturing system, comprising:
a linear guide,
a drive device, a spindle nut, and
a spindle;
wherein the spindle extends along an axis, and
wherein the spindle nut is arranged on the spindle and the spindle nut and the spindle engage with each other;
wherein the drive device is connected to the spindle nut in a manner configured to drive the spindle nut to rotate about the axis,
wherein the spindle nut is configured to move the spindle along the axis upon rotation about the axis,
wherein the spindle has a first spindle groove extending along the axis on a first outer circumferential side,
wherein the linear guide comprises a guide housing arranged to prevent rotation of the guide housing about the axis, and a first ledge element,
wherein the guide housing has a radially outwardly extending first receptacle,
wherein the first ledge element comprises a radially outwardly disposed carrier and a ledge arranged radially inwardly of the carrier and connected to the carrier and extending along the axis, and
wherein the first ledge element engages with the carrier in the first receptacle of the guide housing and with the ledge in the first spindle groove and is configured to guide the spindle in a direction along the axis;
wherein, a second outer circumferential side of the carrier and a first inner circumferential side of the first receptacle are configured correspondingly to each other at least in sections,
wherein the guide housing is fastened in a system housing of the linear system by a fastener, and
wherein the fastener is configured to introduce a clamping force into the guide housing to press the first inner circumferential side of the first receptacle at least sectionally against the second outer circumferential side and to fasten the carrier in the first receptacle thereby.

2. The linear system according to claim 1,
wherein the linear guide comprises a first spring element,
wherein the first ledge element comprises a sliding surface on a side facing the spindle,
wherein the carrier engages through the first receptacle in radial direction and protrudes from the first receptacle on a side facing away from the spindle,
wherein the first spring element is arranged between an outer surface of the guide housing and a carrier outer surface of the carrier, and
wherein the first spring element is configured to position the first ledge element in the first spindle groove in such a way that the sliding surface is arranged in the first spindle groove at a predefined third distance from a spindle groove base of the first spindle groove.

3. The linear system according claim 2, wherein the first spring element comprises an elastic material that is configured as an O-ring.

4. The linear system according to claim 1,
wherein the linear guide comprises a first spring element,
wherein the first ledge element comprises a sliding surface on a side facing the spindle,
wherein the first spring element abuts on the ledge of the first ledge element on the outside, and
wherein the first spring element is configured to hold the ledge of the first ledge element in the first spindle groove in such a way that the sliding surface abuts on the first spindle groove.

5. The linear system according to claim 4,
wherein the first spring element has a ring-shaped embodiment,
wherein the first spring element is arranged on a side of the ledge of the first ledge element facing away from the spindle, and
wherein the first spring element embraces the spindle circumferentially and is arranged at a distance from the spindle.

6. The linear system according to claim 4,
wherein the linear guide comprises at least one second spring element,
wherein the second spring element is offset from the first spring element in a direction along the axis,
wherein the carrier of the first ledge element is arranged between the first spring element and the second spring element,
wherein the second spring element embraces the spindle and radially outwardly abuts against the ledge of the first ledge element, and
wherein the first spring element and the second spring element jointly secure the ledge of the first ledge element in the first spindle groove.

7. The linear system according to claim 1,
wherein the linear guide comprises a plate-like pressure plate arranged in the first receptacle,
wherein the pressure plate has a curved, first abutment surface on a side facing the axis and an arranged third abutment surface on a side facing away from the axis,
wherein the carrier of the first ledge element has a curved second abutment surface radially outwardly,
wherein the second abutment surface abuts the first abutment surface,
wherein the guide housing comprises a radially extending first through-opening and a fixing member,
wherein the first through-opening opens into the first receptacle radially on the inside, and
wherein the fixing element is arranged displaceably in radial direction in the first through-opening and radially inwardly abuts against the third abutment surface of the pressure plate.

8. The linear system according to claim 1,
wherein the spindle comprises a second spindle groove extending along the axis on the first outer circumferential side,
wherein the second spindle groove is circumferentially offset from the first spindle groove,
wherein the linear guide comprises at least a second ledge element and the guide housing comprises a second receptacle,
wherein the second receptacle extends in a radial direction with respect to the axis and is circumferentially offset from the first receptacle, and
wherein the second ledge element engages with a ledge of the second ledge element in the second spindle groove and with a carrier of the second ledge element in the second receptacle.

9. The linear system according to claim 8,
wherein the linear guide comprises a first spring element,
wherein the first ledge element comprises a sliding surface on a side facing the spindle,
wherein the first spring element abuts on the ledge of the first ledge element on the outside, wherein the first spring element is configured to hold the ledge of the first ledge element in the first spindle groove in such a way that the sliding surface abuts on the first spindle groove, wherein the first spring element embraces the spindle, the first ledge element and the second ledge element, and wherein the first spring element radially outwardly abuts against the ledge of the second ledge element and secures the second ledge element in the second spindle groove.

10. The linear system according claim 1, wherein the spindle has a threaded groove on the first outer circumferential side, wherein the threaded groove is helically configured around the axis, wherein the threaded groove and the first spindle groove cross at an angle, and wherein the angle is 65° to 88°.

11. The linear system according to claim 1, wherein the first spindle groove comprises a spindle groove base and the threaded groove comprises a threaded groove base, and wherein the threaded groove base is arranged at a smaller radial distance from the axis than the spindle groove base.

12. The linear system according to claim 1, wherein the first ledge element and the guide housing are formed in one piece and of the same material.

13. A linear system for a manufacturing system, comprising:

a linear guide, a drive device, a spindle nut, and a spindle;

wherein the spindle extends along an axis, and wherein the spindle nut is arranged on the spindle and the spindle nut and the spindle engage with each other;

wherein the drive device is connected to the spindle nut in a manner configured to drive the spindle nut to rotate about the axis, wherein the spindle nut is configured to move the spindle along the axis upon rotation about the axis, wherein the spindle has a first spindle groove extending along the axis on a first outer circumferential side, wherein the linear guide comprises a guide housing arranged to prevent rotation of the guide housing about the axis, and a first ledge element, wherein the guide housing has a radially outwardly extending first receptacle, wherein the first ledge element comprises a radially outwardly disposed carrier and a ledge arranged radially inwardly of the carrier and connected to the carrier and extending along the axis, and wherein the first ledge element engages with the carrier in the first receptacle of the guide housing and with the ledge in the first spindle groove and is configured to guide the spindle in a direction along the axis, wherein the linear guide has a guide sleeve with a guide surface arranged radially on the inside, wherein the guide sleeve is coupled to the system housing and engages around the spindle, and wherein the guide surface abuts on the first outer circumferential side of the spindle and is configured to support a radial force from the spindle acting in the radial direction.

14. A linear system for a manufacturing system, comprising:

a linear guide, a spindle nut, a spindle, and a system housing;

wherein the spindle extends along an axis, wherein the spindle has a first spindle groove extending along the axis on a first outer circumferential side, wherein the linear guide comprises a guide housing arranged to prevent rotation of the guide housing about the axis, and a first ledge element, wherein the guide housing has a radially outwardly extending first receptacle, wherein the first ledge element comprises a radially outwardly disposed carrier and a ledge arranged radially inwardly of the carrier and connected to the carrier and extending along the axis, wherein the first ledge element engages with the carrier in the first receptacle of the guide housing and with the ledge in the first spindle groove and is configured to guide the spindle in a direction along the axis, wherein a second outer circumferential side of the carrier and a first inner circumferential side of the first receptacle are configured correspondingly to each other at least in sections, wherein the guide housing is fastened in the system housing of the linear system by a fastener, wherein the fastener is configured to introduce a clamping force into the guide housing to press the first inner circumferential side of the first receptacle at least sectionally against the second outer circumferential side and to fasten the carrier in the first receptacle thereby, and wherein, a second outer circumferential side of the carrier and a first inner circumferential side of the first receptacle are configured correspondingly to each other at least in sections.

15. A linear system for a manufacturing system, comprising:

a linear guide, a drive device, a spindle nut, and a spindle;

wherein the spindle extends along an axis, and wherein the spindle nut is arranged on the spindle and the spindle nut and the spindle engage with each other;

wherein the drive device is connected to the spindle nut in a manner configured to drive the spindle nut to rotate about the axis, wherein the spindle nut is configured to move the spindle along the axis upon rotation about the axis, wherein the spindle has a first spindle groove extending along the axis on a first outer circumferential side, wherein the linear guide comprises a guide housing arranged to prevent rotation of the guide housing about the axis, and a first ledge element, wherein the guide housing has a radially outwardly extending first receptacle, wherein the first ledge element comprises a radially outwardly disposed carrier and a ledge arranged radially inwardly of the carrier and connected to the carrier and extending along the axis, wherein the first ledge element engages with the carrier in the first receptacle of the guide housing and with the ledge in the first spindle groove and is configured to guide the spindle in a direction along the axis, wherein the linear guide comprises a first spring element, wherein the first ledge element comprises a sliding surface on a side facing the spindle, wherein the carrier engages through the first receptacle in radial direction and protrudes from the first receptacle on a side facing away from the spindle, wherein the first spring element is arranged between an outer surface of the guide housing and a carrier outer surface of the carrier, and wherein the first spring element is configured to position the first ledge element in the first spindle groove in such a way that the sliding surface is arranged in the first spindle groove at a predefined third distance from a spindle groove base of the first spindle groove.

16. The linear system according to claim 15, wherein the first spring element comprises an elastic material that is configured as an O-ring.

17. A method of assembling a linear system, wherein the linear system is configured according claim 14, wherein the carrier is inserted into the first receptacle, and wherein the ledge of the first ledge element is inserted into the first spindle groove; and characterized in that:

the guide housing is fastened within the system housing of the linear system with the aid of the fastener in that a clamping force is introduced into the guide housing by the fastener in order to press the first inner circumferential side of the first receptacle against the second outer circumferential side at least in sections and to fasten the carrier within the first receptacle thereby.

* * * * *